(12) United States Patent
Huffman et al.

(10) Patent No.: US 11,575,571 B2
(45) Date of Patent: Feb. 7, 2023

(54) CENTRALIZED SECURITY EVENT GENERATION POLICY

(71) Applicant: Rockwell Automation Technologies, Inc., Mayfield Heights, OH (US)

(72) Inventors: David E Huffman, Lake Mills, WI (US); Taryl Jasper, South Euclid, OH (US); Jack Visoky, Willoughby, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 264 days.

(21) Appl. No.: 16/870,075

(22) Filed: May 8, 2020

(65) Prior Publication Data
US 2021/0351980 A1    Nov. 11, 2021

(51) Int. Cl.
*H04L 41/0816* (2022.01)
*H04L 9/40* (2022.01)

(52) U.S. Cl.
CPC ...... *H04L 41/0816* (2013.01); *H04L 63/0209* (2013.01); *H04L 63/1425* (2013.01); *H04L 63/1441* (2013.01); *H04L 63/20* (2013.01)

(58) Field of Classification Search
CPC ............. H04L 41/0816; H04L 63/0209; H04L 63/1425; H04L 63/1441; H04L 63/20
See application file for complete search history.

(56) References Cited

U.S. PATENT DOCUMENTS 7,849,497 B1   12/2010   Hurst et al.
7,966,659 B1   6/2011    Wilkinson et al.
8,799,985 B2   8/2014    Vinberg et al.
9,054,961 B1   6/2015    Kim et al.
9,369,431 B1   6/2016    Kirby et al.
(Continued)

FOREIGN PATENT DOCUMENTS

| EP | 1645926 A1 | 4/2006 |
|---|---|---|
| EP | 2775685 A1 | 9/2014 |
| EP | 3196716 A1 | 7/2017 |

OTHER PUBLICATIONS

Extended European Search Report for EP Patent Application Serial No. 17151596.8-1802 dated May 16, 2017, 9 pages.
(Continued)

*Primary Examiner* — Minh Chau Nguyen
(74) *Attorney, Agent, or Firm* — Amin, Turocy & Watson, LLP

(57) ABSTRACT

A model-based industrial security policy configuration system implements a plant-wide industrial asset security policy in accordance with security policy definitions provided by a user. The configuration system models the collection of industrial assets for which diverse security policies are to be implemented. An interface allows the user to define zone-specific security configuration and event management policies for a plant environment at a high-level based on a security model that groups the industrial assets into security zones. Based on the model and these policy definitions, the system generates asset-level security setting instructions configured to set appropriate device settings on one or more of the industrial assets to implement the security event management policies, and deploys these instructions to the appropriate assets in order to implement the defined policies.

20 Claims, 33 Drawing Sheets

(56) References Cited

U.S. PATENT DOCUMENTS

| | | | |
|---|---|---|---|
| 9,454,660 | B2 | 9/2016 | Koizumi |
| 9,967,149 | B1 | 5/2018 | Fiennes |
| 10,560,487 | B2 * | 2/2020 | Shulman-Peleg ............................ H04L 63/1441 |
| 10,681,079 | B2 | 6/2020 | Schneider et al. |
| 10,904,070 | B2 * | 1/2021 | Lo ............................ H04L 43/08 |
| 10,972,508 | B1 | 4/2021 | Dods |
| 2002/0007454 | A1 | 1/2002 | Tarpenning et al. |
| 2005/0283823 | A1 | 12/2005 | Okajo et al. |
| 2005/0283824 | A1 | 12/2005 | Nakamura et al. |
| 2006/0005228 | A1 | 1/2006 | Matsuda |
| 2007/0050777 | A1 | 3/2007 | Hutchinson et al. |
| 2008/0022093 | A1 | 1/2008 | Kurien et al. |
| 2009/0077621 | A1 | 3/2009 | Lang et al. |
| 2009/0089869 | A1 | 4/2009 | Varghese |
| 2009/0259855 | A1 | 10/2009 | De Cesare et al. |
| 2009/0271504 | A1 | 10/2009 | Ginter et al. |
| 2010/0079488 | A1 | 4/2010 | McGreevy et al. |
| 2011/0039237 | A1 | 2/2011 | Skare |
| 2012/0089240 | A1 | 4/2012 | Chand et al. |
| 2013/0031037 | A1 | 1/2013 | Brandt et al. |
| 2013/0083347 | A1 | 4/2013 | Perez et al. |
| 2013/0152183 | A1 | 6/2013 | Plewnia et al. |
| 2013/0167191 | A1 | 6/2013 | Barnett et al. |
| 2013/0211546 | A1 | 8/2013 | Lawson et al. |
| 2013/0318343 | A1 | 11/2013 | Bjamason et al. |
| 2013/0318571 | A1 | 11/2013 | Radzikowski et al. |
| 2014/0244833 | A1 | 8/2014 | Sharma et al. |
| 2014/0283109 | A1 | 9/2014 | Quong |
| 2014/0285838 | A1 | 9/2014 | Bettineski et al. |
| 2016/0093191 | A1 | 3/2016 | Bloom et al. |
| 2016/0094578 | A1 | 3/2016 | McQuillan et al. |
| 2016/0112406 | A1 * | 4/2016 | Bugrov ............... H04L 63/102 726/10 |
| 2016/0149861 | A1 | 5/2016 | Batke et al. |
| 2016/0224048 | A1 | 8/2016 | Rooyakkers et al. |
| 2016/0344738 | A1 | 11/2016 | Dotan et al. |
| 2016/0344773 | A1 | 11/2016 | Knjazihhin et al. |
| 2017/0054757 | A1 | 2/2017 | Siswick et al. |
| 2017/0099647 | A1 | 4/2017 | Shah et al. |
| 2017/0214717 | A1 | 7/2017 | Bush et al. |
| 2017/0295190 | A1 * | 10/2017 | Brown ............... H04L 63/1416 |
| 2017/0324779 | A1 | 11/2017 | Lang et al. |
| 2018/0004942 | A1 | 1/2018 | Martin et al. |
| 2018/0025304 | A1 | 1/2018 | Fisher et al. |
| 2018/0219914 | A1 | 8/2018 | Reith et al. |
| 2018/0367417 | A1 * | 12/2018 | Dixit ............... H04L 41/16 |
| 2018/0367541 | A1 | 12/2018 | Ponnuswamy et al. |
| 2019/0069154 | A1 | 2/2019 | Booth et al. |
| 2019/0089742 | A1 | 3/2019 | Hill |
| 2019/0124063 | A1 | 4/2019 | Cui et al. |
| 2019/0149400 | A1 | 5/2019 | Plache |
| 2019/0163147 | A1 | 5/2019 | D'Amato et al. |
| 2019/0165941 | A1 | 5/2019 | Ray et al. |
| 2019/0215319 | A1 | 7/2019 | Hu et al. |
| 2019/0280782 | A1 | 9/2019 | Elberbaum |
| 2019/0340269 | A1 | 11/2019 | Biernat et al. |
| 2019/0349347 | A1 | 11/2019 | Curtis et al. |
| 2019/0356482 | A1 | 11/2019 | Nix |
| 2019/0361917 | A1 | 11/2019 | Tran et al. |
| 2020/0064797 | A1 | 2/2020 | Hannon et al. |
| 2020/0112586 | A1 | 4/2020 | Cooper et al. |
| 2020/0120143 | A1 | 4/2020 | Nicoll et al. |
| 2020/0174798 | A1 | 6/2020 | Lehto et al. |
| 2020/0202026 | A1 | 6/2020 | Dharanikota et al. |
| 2020/0202231 | A1 | 6/2020 | Jannu et al. |
| 2020/0225655 | A1 | 7/2020 | Cella et al. |
| 2020/0244658 | A1 | 7/2020 | Brand |
| 2020/0259864 | A1 | 8/2020 | Softer et al. |
| 2020/0320845 | A1 | 10/2020 | Livny et al. |
| 2020/0327202 | A1 | 10/2020 | Tran et al. |
| 2020/0348662 | A1 | 11/2020 | Cella et al. |
| 2020/0372154 | A1 * | 11/2020 | Bacher ............... H04L 41/147 |
| 2021/0096545 | A1 | 4/2021 | Stump et al. |
| 2021/0194888 | A1 * | 6/2021 | Bhaskar S ............ H04L 63/102 |
| 2021/0255606 | A1 | 8/2021 | Caruso et al. |
| 2021/0312393 | A1 | 10/2021 | Stump et al. |
| 2021/0328999 | A1 | 10/2021 | Chu et al. |
| 2021/0351980 | A1 | 11/2021 | Huffman et al. |

OTHER PUBLICATIONS

Luciana Obregon; Secure Architecture for Industrial Control Systems; SANS Institute InfoSec Reading Room Template Version Sep. 2014, Accepted Sep. 23, 2015; 28 pages.

Non-Final Office Action received for U.S. Appl. No. 15/147,667 dated Nov. 15, 2017, 33 pages.

Extended European Search Report for EP Patent Application Serial No. 21170910.0 dated Oct. 6, 2021, 7 pages.

Extended European Search Report for EP Patent Application Serial No. 21171811.9 dated Sep. 13, 2021, 7 pages.

Non Final Office Action received for U.S. Appl. No. 16/870,117 dated Apr. 4, 2022, 61 pages.

Communication Pursuant to Article 94(3) EPC received for U.S. Patent Application Serial No. 17151596.8 dated Mar. 6, 2018, 5 pages.

Final Office Action received for U.S. Appl. No. 16/870,117 dated Aug. 8, 2022, 59 pages.

Notice of Allowance received for U.S. Appl. No. 16/870,117 dated Oct. 24, 2022, 44 pages.

* cited by examiner

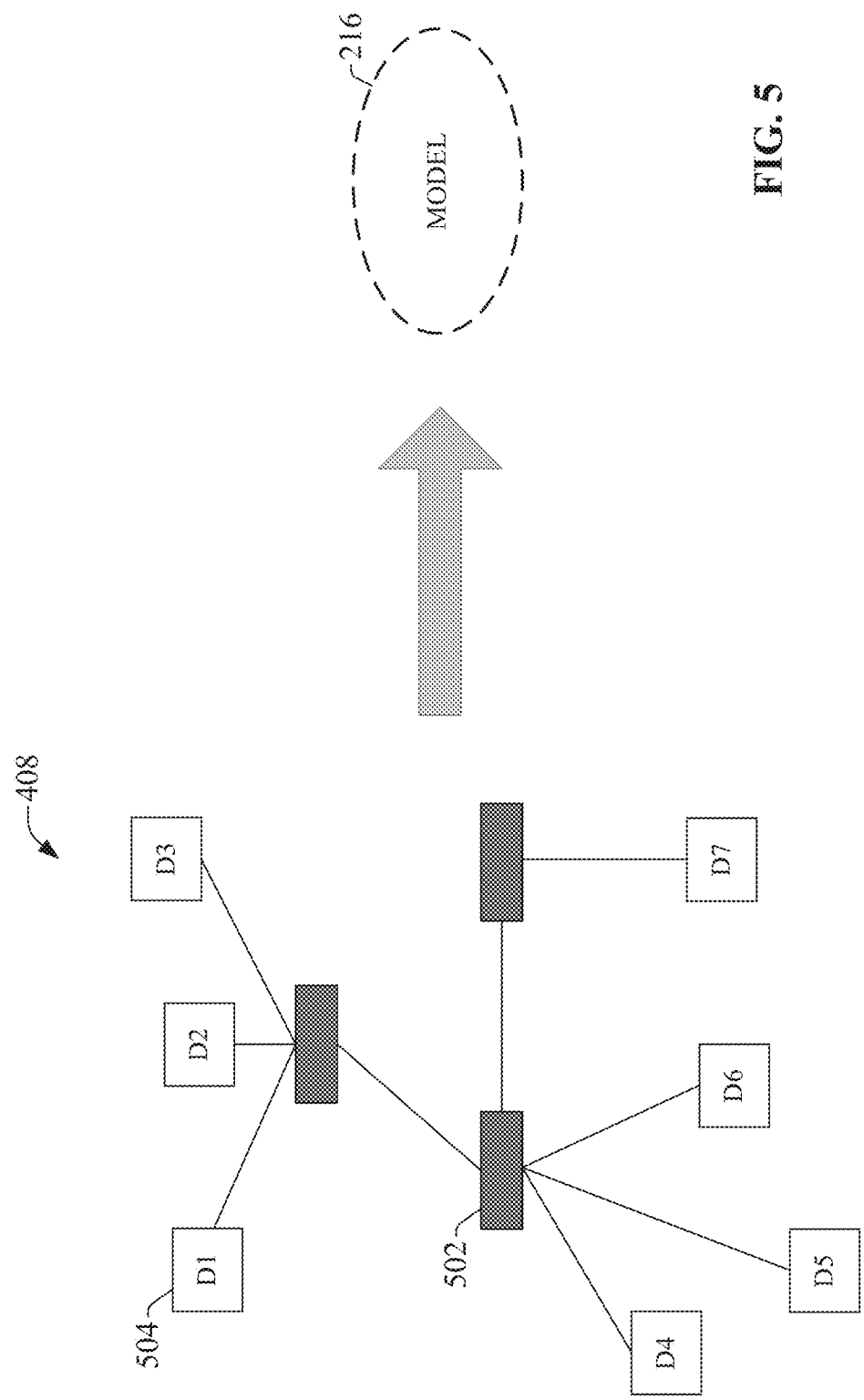

Two Zones, Asset to Asset (no CIP Security)
D1 and D5 can communicate with no security (asset-to-asset)

Zone Definition — 702

| Zone | User Cert | PSK | Whitelist | Notes | I/O | Messaging | Messaging Confidentiality |
|---|---|---|---|---|---|---|---|
| Z1 | | X | | Machine 1 | Not Secure | Secure | No |
| Z2 | | X | | Machine 2 | Not Secure | Secure | No |

Conduit Definition — 706

| Conduit | End Point | End Point |
|---|---|---|
| #1 - Whitelist | Asset - D1 | Asset - D5 |

Asset Definition — 704

| Asset Name | Asset Catalog Number | Asset Zone | Asset IP Address | CIP Security Capable |
|---|---|---|---|---|
| D1 | L8z | Z1 | 192.168.1.1 | Yes |
| D2 | 1756-EN4T | Z1 | 192.168.1.2 | Yes |
| D3 | 1756-EN4T | Z1 | 192.168.1.3 | Yes |
| D4 | L8z | Z2 | 192.168.1.4 | Yes |
| D5 | Large Neo | Z2 | 192.168.1.5 | Yes |
| D6 | 1756-EN4T | Z2 | 192.168.1.6 | Yes |

FIG. 7A

Two Zones, Asset to Asset (Legacy Device)
D1 can communicate with no security to D4 (asset-to-asset)

Zone Table

| Zone | User Cert | PSK | Whitelist | Notes | I/O | Messaging Secure | Messaging Confidentiality |
|---|---|---|---|---|---|---|---|
| Z1 | | X | | Machine 1 | Not Secure | | No |
| Z2 | | | | Machine 2 | | | |

Conduit Table

| | | Conduit #1-Whitelist | End Point Asset - D1 | End Point Asset - D4 |
|---|---|---|---|---|

Asset Table

| Asset Name | Asset Catalog Number | Asset Zone | Asset IP Address | CIP Security Capable |
|---|---|---|---|---|
| D1 | 1756-EN5T | Z1 | 192.168.1.1 | Yes |
| D2 | Workstation | Z1 | 192.168.1.2 | Yes |
| D3 | 1756-EN2T | Z1 | 192.168.1.3 | Yes |
| D4 | Adapter | Z2 | 192.168.1.4 | No |

FIG. 8A

| Zone | User Cert | PSK | Whitelist | Notes |
|---|---|---|---|---|
| Z1 | X | | | Machine 1 |
| Z2 | X | | | Machine 2 |
| Z3 | | | | Supervisory |

Line Supervisor - mix of legacy and secure devices (1 - many)
D1 - D8 and D5 - D8 (no security) and D1-D5 (secure) (asset-to-asset)

| | | | | | | I/O | Messaging | Messaging Confidentiality |
|---|---|---|---|---|---|---|---|---|
| | | | | | | Not Secure | Secure | No |
| | | | | | | Not Secure | Secure | No |

| Asset Name | Asset Catalog Number | Asset Zone | Asset IP Address | CIP Security Capable | Conduit | End Point | | End Point |
|---|---|---|---|---|---|---|---|---|
| D1 | 1756-EN2T | Z1 | 192.168.1.1 | Yes | #1 - Whitelist | Asset - D1 | | Asset - D8 |
| D2 | 1756-EN6T | Z1 | 192.168.1.2 | Yes | #2 - Whitelist | Asset - D5 | | Asset - D8 |
| D3 | Legacy HMI | Z1 | 192.168.1.3 | Yes | #3 - User Cert | Asset - D1 | | Asset - D5 |
| D4 | Workstation | Z2 | 192.168.1.4 | Yes | | | | |
| D5 | 1756-EN6T | Z2 | 192.168.1.5 | Yes | | | | |
| D6 | 1756-EN6T | Z2 | 192.168.1.6 | Yes | | | | |
| D7 | 1756-EN6T | Z3 | 192.168.1.7 | No | | | | |
| D8 | 1756-EN6T | Z3 | 192.168.1.8 | No | | | | |

FIG. 9A

Line Supervisor, multi trust zones (3 secure zones)
Zone 3 can communicate with Zone 1 and with Zone 2 securely (zone-to-zone)

| Zone | User Cert | PSK | Whitelist | Notes |
|---|---|---|---|---|
| Z1 | X | | | Machine 1 |
| Z2 | X | | | Machine 2 |
| Z3 | X | | | Supervisory |

| | I/O | Messaging | Messaging Confidentiality |
|---|---|---|---|
| | Not Secure | Secure | No |
| | Not Secure | Secure | No |
| | Not Secure | Secure | No |

| Asset Name | Asset Catalog Number | Asset Zone | Asset IP Address | CIP Security Capable |
|---|---|---|---|---|
| D1 | L8z | Z1 | 192.168.1.1 | Yes |
| D2 | 1756-EN4T | Z1 | 192.168.1.2 | Yes |
| D3 | Neo | Z1 | 192.168.1.3 | Yes |
| D4 | L8z | Z2 | 192.168.1.4 | Yes |
| D5 | Large Neo | Z2 | 192.168.1.5 | Yes |
| D6 | 1756-EN4T | Z2 | 192.168.1.6 | Yes |
| D7 | ViewSE | Z3 | 192.168.1.7 | Yes |
| D8 | Workstation | Z3 | 192.168.1.8 | Yes |

| Conduit | End Point | End Point |
|---|---|---|
| #1 - Use Cert | Zone - Z1 | Zone - Z3 |
| #2 - Use Cert | Zone - Z2 | Zone - Z3 |

FIG. 10A

Line Supervisor, multi trust zones (legacy and secure zones)
Zone 3 can communicate with Zone 1 and with Zone 2 w/no security (zone-to-zone)

Zone Definition

| Zone | User Cert | PSK | Whitelist | Notes | I/O | Messaging | Messaging Confidentiality |
|---|---|---|---|---|---|---|---|
| Z1 | X | | | Machine 1 | Not Secure | Secure | No |
| Z2 | X | | | Machine 2 | Not Secure | Secure | No |
| Z3 | | | | Supervisory | | | |

Asset Definition

| Asset Name | Asset Catalog Number | Asset Zone | Asset IP Address | CIP Security Capable |
|---|---|---|---|---|
| D1 | L8z | Z1 | 192.168.1.1 | Yes |
| D2 | 1756-EN4T | Z1 | 192.168.1.2 | Yes |
| D3 | Neo | Z1 | 192.168.1.3 | Yes |
| D4 | L8z | Z2 | 192.168.1.4 | Yes |
| D5 | Large Neo | Z2 | 192.168.1.5 | Yes |
| D6 | 1756-EN4T | Z2 | 192.168.1.6 | Yes |
| D7 | ViewSE | Z3 | 192.168.1.7 | No |
| D8 | Workstation | Z3 | 192.168.1.8 | No |

Conduit Definition

| Conduit | End Point | End Point |
|---|---|---|
| #1 - Whitelist | Zone - Z1 | Zone - Z3 |
| #2 - Whitelist | Zone - Z2 | Zone - Z3 |

FIG. 11A

| Zone | Vendor Cert | PSK | Whitelist | Notes | I/O | Messaging Secure | Messaging Confidentiality |
|---|---|---|---|---|---|---|---|
| Z1 | X | | | Machine 1 | Not Secure | | |
| Z2 | | | | Machine 2 | | | |

Line Supervisor multi trust zones (legacy and secure zones - vendor cert)
Zone 1 can communicate with Zone 2 w/no security (zone to zone)

| Asset Name | Asset Catalog Number | Asset Zone | Asset IP Address | CIP Security Capable | Conduit | End Point | End Point |
|---|---|---|---|---|---|---|---|
| D1 | L8z | Z1 | 192.168.1.1 | Yes | #1 - Whitelist | Zone - Z1 | Zone - Z2 |
| D2 | 1756-EN4T | Z1 | 192.168.1.2 | Yes | | | |
| D3 | Neo | Z1 | 192.168.1.3 | Yes | | | |
| D4 | L8z | Z1 | 192.168.1.4 | Yes | | | |
| D5 | Large Neo | Z1 | 192.168.1.5 | Yes | | | |
| D6 | 1756-EN4T | Z1 | 192.168.1.6 | Yes | | | |
| D7 | ViewSE | Z2 | 192.168.1.7 | No | | | |
| D8 | Workstation | Z2 | 192.168.1.8 | No | | | |

FIG. 12A

Line Supervisor, zone to device trust (with CIP Security)
D2 and D6 can communicate with Z3 (asset-to-zone)

Zone Rules

| Zone | User Cert | PSK | Whitelist | Notes | I/O | Messaging | Messaging Confidentiality |
|------|-----------|-----|-----------|-------|-----|-----------|---------------------------|
| Z1 | X | | | Machine 1 | Not Secure | Secure | No |
| Z2 | X | | | Machine 2 | Not Secure | Secure | No |
| Z3 | X | | | Supervisory | Not Secure | Secure | No |

Conduit Rules

| Asset Name | Asset Catalog Number | Asset Zone | Asset IP Address | CIP Security Capable | Conduit | End Point | End Point |
|------------|---------------------|------------|------------------|----------------------|---------|-----------|-----------|
| D1 | 1756-EN5T | Z1 | 192.168.1.1 | Yes | #1 Use Cert | Asset - D2 | Zone - Z3 |
| D2 | 1756-EN5T | Z1 | 192.168.1.2 | Yes | #2 Use Cert | Asset - D6 | Zone - Z3 |
| D3 | 1756-EN5T | Z1 | 192.168.1.3 | Yes | | | |
| D4 | Workstation | Z3 | 192.168.1.4 | Yes | | | |
| D5 | HMI | Z3 | 192.168.1.5 | Yes | | | |
| D6 | 1756-EN5T | Z2 | 192.168.1.7 | Yes | | | |

FIG. 13A

CENTRALIZED SECURITY EVENT GENERATION POLICY

BACKGROUND

The subject matter disclosed herein relates generally to industrial automation systems, and, more particularly, to autonomous deployment of security configuration and event generation policies in an industrial environment.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system for configuring security event management in an industrial environment is provided, comprising an interface component configured to generate an interface display configured to receive, via interaction with the interface display, security event definition data that defines security event management policies to be applied to respective security zones of an industrial environment, wherein the security zones are defined by a security model that defines groupings of industrial devices into the security zones; an instruction translation component configured to generate one or more configuration instructions directed to one or more of the industrial devices based on the security event definition data and the security model, wherein the one or more configuration instructions are configured to set respective device-level configuration settings on the one or more of the industrial devices that cause the one or more industrial devices to implement the security event management policies in the respective security zones; and a communication component configured to send the one or more configuration instructions to the one or more of the industrial devices.

Also, according to one or more embodiments, a method for configuring industrial security event management policies is provided, comprising receiving, by a system comprising a processor via interaction with an interface display, security event definition data that defines security event management policies for respective security zones of an industrial facility, wherein the security zones are defined by a security model that defines an organization of industrial devices into the security zones; generating, by the system based on the security event definition data and the security model, one or more configuration instructions directed to one or more of the industrial devices, wherein the one or more configuration instructions are configured to, in response to execution on the one or more industrial devices, configure device-level configuration parameters on the one or more of the industrial devices that cause the one or more industrial devices to enforce the security event management policies in the respective security zones; and sending, by the system, the one or more configuration instructions to the one or more of the industrial devices.

Also, a non-transitory computer-readable medium is provided having stored thereon executable instructions that, in response to execution, cause a system comprising a processor to perform operations, the operations comprising receiving, via interaction with an interface display, security event definition data that defines security event management policies for respective security zones of an industrial plant, wherein the security zones are defined by a security model that defines a segregation of industrial devices into the security zones; generating, based on the security event definition data and the security model, one or more configuration instructions directed to one or more of the industrial devices, wherein the one or more configuration instructions are configured to, in response to execution on the one or more industrial devices, set device-level configuration parameters on the one or more of the industrial devices to cause the one or more industrial devices to enforce the security event management policies in the respective security zones; and sending the one or more configuration instructions to the one or more of the industrial devices.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 5 is a diagram illustrating the modeling of a network of industrial assets by a model-based security policy configuration system.

FIG. 7A is a table illustrating example configuration input that can be provided to a security configuration system by a user in order to implement a security policy.

FIG. 8A is a table illustrating example configuration input that can be provided to a security configuration system by a user in order to implement a security policy.

FIG. 9A is a table illustrating example configuration input that can be provided to a security configuration system by a user in order to implement a security policy.

FIG. 10A is a table illustrating example configuration input that can be provided to a security configuration system by a user in order to implement a security policy.

FIG. 11A is a table illustrating example configuration input that can be provided to a security configuration system by a user in order to implement a security policy.

FIG. 12A is a table illustrating example configuration input that can be provided to a security configuration system by a user in order to implement a security policy.

FIG. 13A is a table illustrating example configuration input that can be provided to a security configuration system by a user in order to implement a security policy.

DETAILED DESCRIPTION

Figure 1:
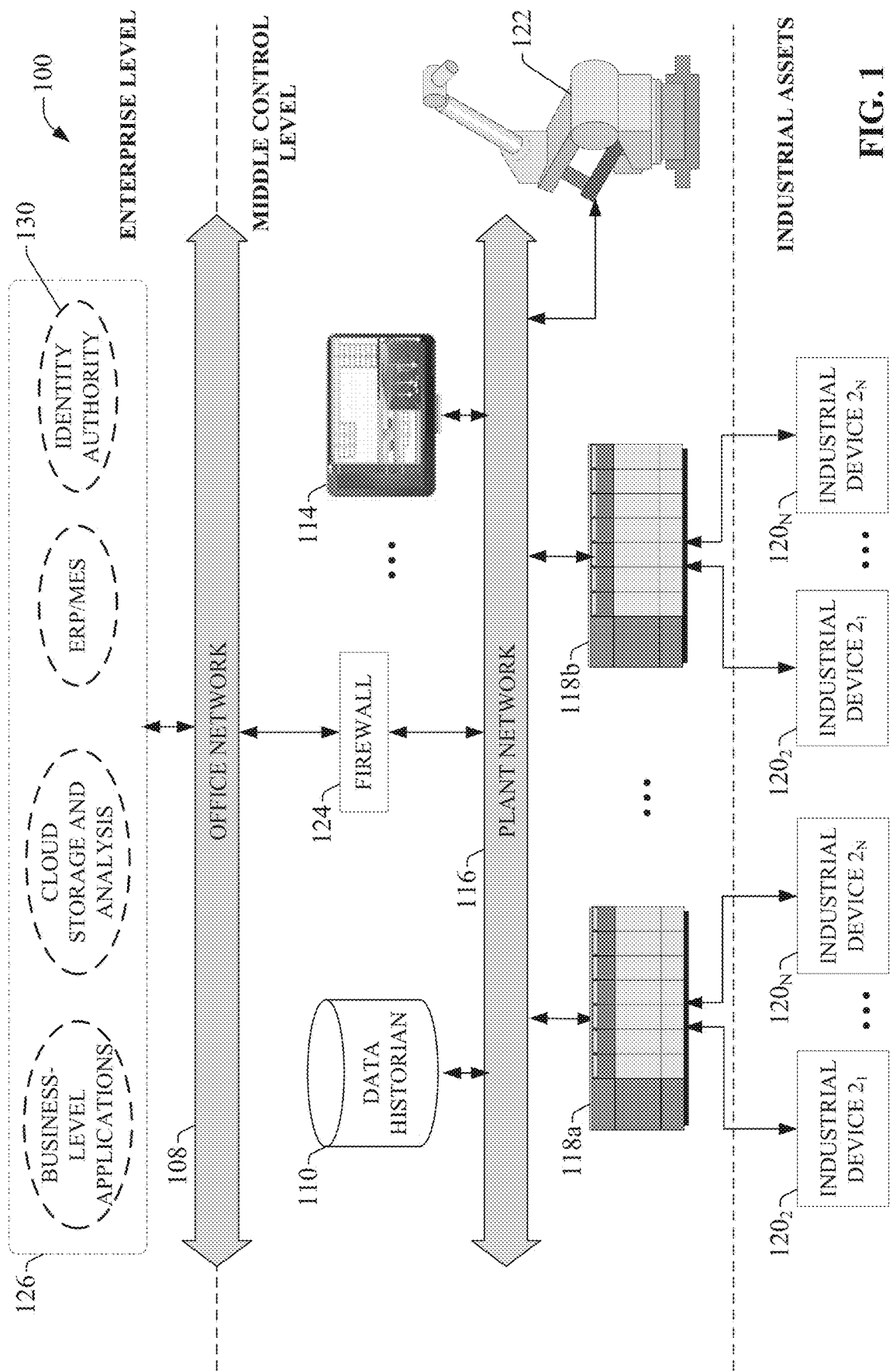
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Other industrial devices or assets can include industrial robots 122, which may operate in accordance with programs executed by their own internal controllers, in conjunction with information exchanged with one or more external controllers (e.g., PLCs 118). Some industrial environments may also include a number of sub-systems that perform various production, quality, or safety functions, including but not limited to vision systems, safety systems (e.g., optical presence sensing systems, safety relay systems, etc.), product quality check systems (e.g., leak test systems), or other such assets.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

Since so many industrial devices, systems, and assets reside on plant and/or office networks, system designers must often configure network security features that prevent unauthorized access to the industrial assets by unauthorized users or devices. Such security measures are required to prevent unauthorized viewing of production data or other sensitive information, or to prevent remote entities from assuming control of the industrial assets and modifying control sequences or device parameters. Configuring security for industrial assets may include, for example, defining access permissions for respective industrial assets (e.g., specifying which other devices or personnel may access a given industrial asset), configuring digital certificates or key-based security for secure data exchange between devices, assigning Internet Protocol (IP) addresses to respective devices, defining network workgroups, configuring firewall parameters to filter access to devices and systems on a plant or office network, configuring whitelists explicitly defining which devices are permitted to exchange data with a given asset, or other such configuration actions.

Typically, configuring security for an industrial automation environment requires a user to configure security parameters and definitions for a large number of separate devices individually. This can be a time-consuming process in an industrial environment comprising a large number of industrial assets and network infrastructure devices. Moreover, configuring these industrial assets for security often requires specialized knowledge of the individual devices being configured, thereby limiting the number of personnel qualified to configure and manage security settings for an industrial environment. Security configuration can be rendered more difficult when the industrial environment comprises devices manufactured by a number of different device vendors, since the tools and procedures for configuring security settings and parameters for industrial devices can vary considerably across different product vendors. As such, a plant engineer responsible for configuring device security in an industrial environment requires knowledge of a wide range of vendor-specific security configuration tools and parameter settings. Also, since security parameters and policies for the respective devices must be configured manually for each device individually, the process of defining security policies is prone to human error. Such errors may result in blocked communications between devices that require a reliable channel for data exchange. Finding and correcting these configuration errors can be a time-consuming and complicated process, and is often cited as a reason why owners of industrial assets opt to leave device security features disabled, putting the industrial devices and processes at risk.

To address these and other issues, one or more embodiments of the present disclosure relate to a model-based security policy configuration system for industrial automation devices and assets. In one or more embodiments, the configuration system can maintain a model of an industrial environment that inventories industrial devices and network infrastructure devices distributed throughout a plant environment, as well as networked interconnections and relationships between the various devices. A user interface associated with the configuration system allows a user to group sets of devices that share a common security context into security zones using an integrated modeling tool. This model can be used to define policies for secure communication between devices, event originator policies, or other security aspects. For example, each security zone defined in the model can comprise devices that are to communicate with one another in a secure manner as part of normal operation of an automation system, and which share common security requirements. Devices outside a given security zone can be prevented from communicating with devices within the zone. If communication to devices outside the zone are required, the user can define a conduit between a device within the zone and a device outside the zone, between devices within the zone and another zone, or between the zone and another zone, depending on communication requirements.

Once all necessary devices of an automation system or plant environment have been added to respective security zones and any desired conduits are defined, the configuration system can implement a system-wide security policy based on the zone and conduit information defined by the user, as well as the system model. The configuration system translates the defined security policy into device-level security configuration instructions that are then downloaded or otherwise sent to the appropriate devices (e.g., network infrastructure devices and/or industrial devices) in order to implement the defined security policy. This translation can be based on defined translation rules maintained by the configuration system. These translation rules can include vendor-specific rules capable of generating appropriate security configuration instructions for respective vendor-specific devices. In this way, the system hides or abstracts from the user the technical complexities associated with setting device-level security parameters. The configuration system also abstracts the cross-vendor or cross-product differences in technology required to enforce the security policy.

The system model can also be used to define and deploy security event management policies to the industrial devices. This can include, for example, configuring security notifications to be generated by the devices in response to detection of a security related event on the control network (e.g., detection of an unauthorized attempt to access an industrial device remotely, detection of overloaded network traffic indicative of a denial-of-service attack, detection of an attempt to perform an invalid modification to a control parameter, etc.). The types of notifications, and the identities of personnel or equipment that should be sent the notifications, can be defined as a function of a category or type of the detected event, a severity of the event, or other event characteristics. By allowing the user to decompose the automation environment into security zones, the system model can serve as a device grouping mechanism for defining security event handling for the industrial environment.

Figure 2:
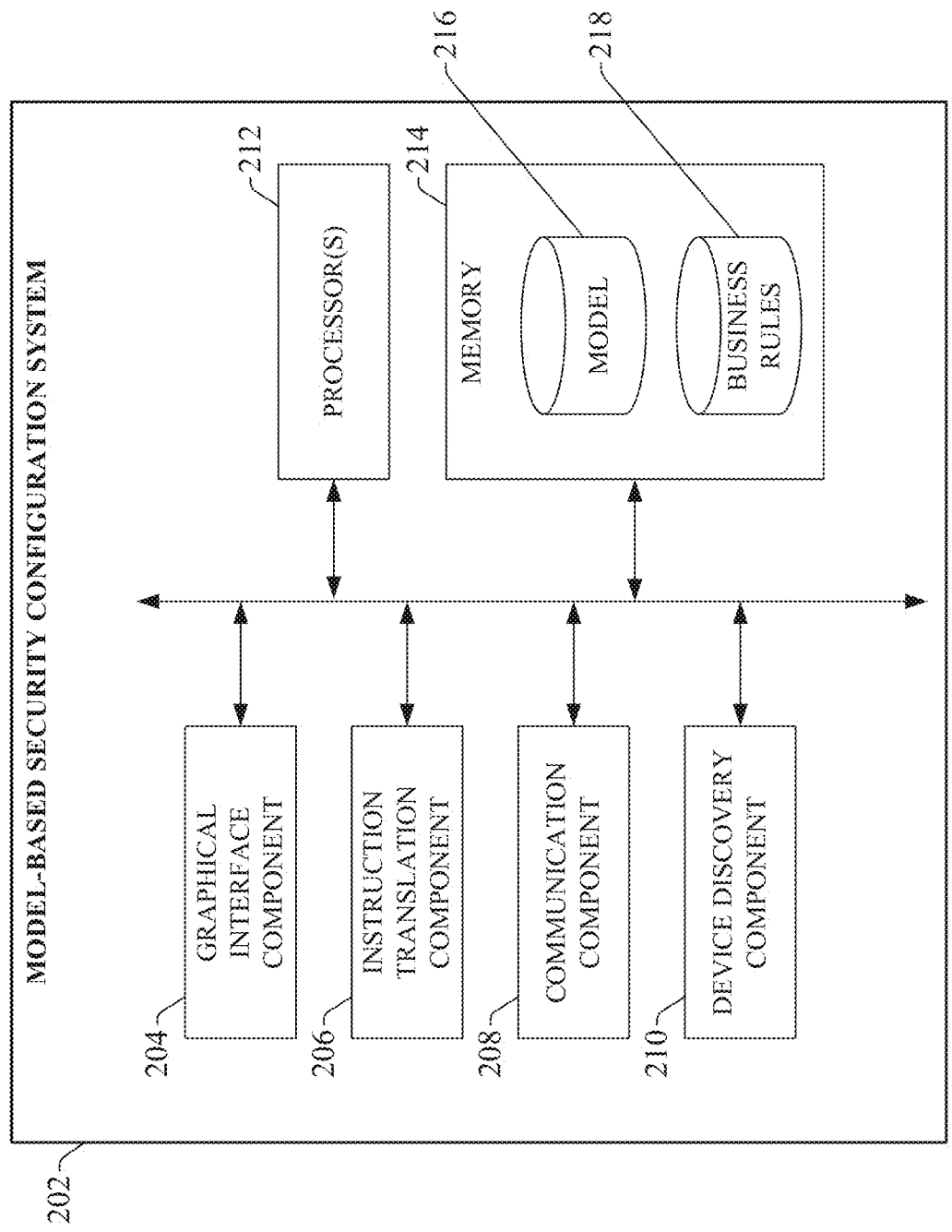
FIG. 2 is a block diagram of an example model-based security configuration system.

FIG. 2 is a block diagram of an example model-based security configuration system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Model-based security configuration system 202 can include a graphical interface component 204, an instruction translation component 206, a communication component 208, a device discovery component 210, one or more processors 212, and memory 214. In various embodiments, one or more of the graphical interface component 204, instruction translation component 206, communication component 208, device discovery component 210, the one or more processors 212, and memory 214 can be electrically and/or communicatively coupled to one another to perform one or more of the functions of the model-based security configuration system 202. In some embodiments, components 204, 206, 208, and 210 can comprise software instructions stored on memory 214 and executed by processor(s) 212. Model-based security configuration system 202 may also interact with other hardware and/or software components not depicted in FIG. 2. For example, processor(s) 212 may interact with one or more external user interface devices, such as a keyboard, a mouse, a display monitor, a touchscreen, or other such interface devices.

Graphical interface component 204 can be configured to generate a set of graphical user interface displays with which a user can interact in order to define security zones, assign industrial and networking devices to defined zones, define conduits between devices and/or zones, download or distribute security configuration instructions to appropriate devices that make up an industrial automation environment, and other such functions. Example displays will be described in more detail below.

Instruction translation component 206 can be configured to read device, zone, and conduit information provided by the user (or automatically detected by the configuration system 202) and generate a set of security configuration instructions that, when implemented on respective industrial and/or networking devices, enforce the plant-wide security strategy defined by the user-provided device, zone, and conduit information. The instruction translation component 206 can generate these instructions based on a stored model 216 that describes the inventory of industrial and networking devices that make up the user's plant environment, as well as the networked connectivity between the devices. This model 216 includes vendor and model information for the various devices, allowing instruction translation component 206 to generate appropriate vendor- and model-specific security configuration instructions that will implement the user's desired security policies. Instruction translation component 206 can also generate these instructions based on defined business rules 218 that determine how security configuration conflicts are to be resolved for a given scenario.

Communication component 208 can be configured to exchange data between the model-based security configuration system 202 and devices on a plant and/or office network. This can include, for example, sending security configuration instructions to the devices, polling for device identification and configuration information, etc. Device discovery component 210 can be configured to discover and identify devices on the plant network for which security is to be configured. This can include identifying model information, vendor information, firmware revision information, network identifiers, or other such information.

The one or more processors 212 can perform one or more of the functions described herein with reference to the systems and/or methods disclosed. Memory 214 can be a computer-readable storage medium storing computer-executable instructions and/or information for performing the functions described herein with reference to the systems and/or methods disclosed.

Figure 3:
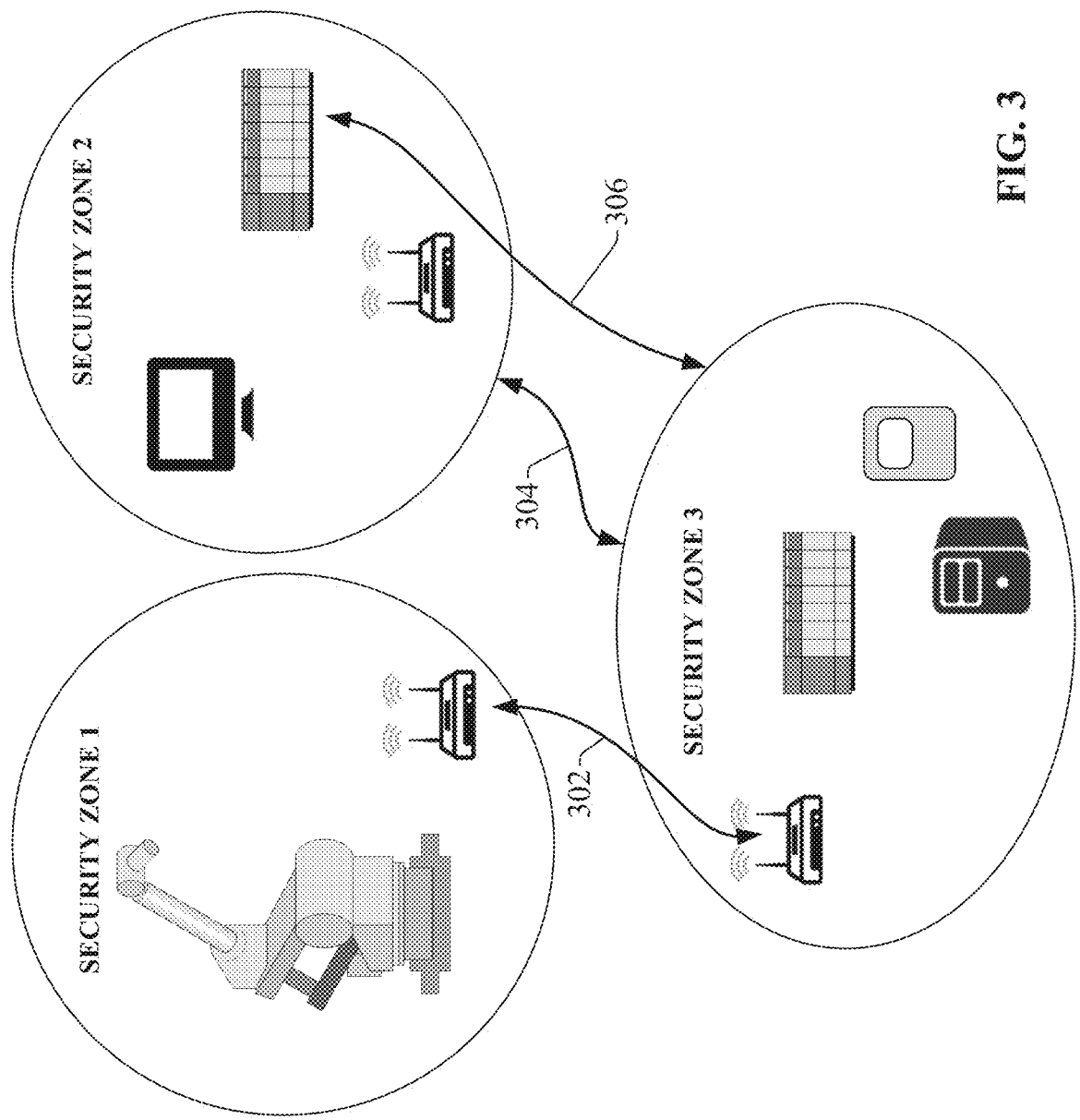
FIG. 3 is a diagram illustrating assignment of industrial devices to various security zones.

The model-based security configuration system described herein allows a user to easily create a security model for their collection of networked industrial assets, which is then used by the system to generate device-specific security configuration instructions and set device security parameters for individual devices on the network. The security model can be based on IEC 62443 standards, which recommend defining zones of trust within a given plant environment, such that devices that are to be allowed to communicate securely and which share common security requirements are assigned to a common zone. FIG. 3 is a diagram illustrating assignment of industrial devices to various security zones. In this example, a number of industrial devices have been grouped into three security zones. In general, each zone is a grouping of logical or physical assets that share common security requirements. Devices within a common security zone are to be allowed to exchange data with one another via secure communication channels, but are not permitted to communicate with devices that are not assigned to that zone unless a channel or conduit is defined. A channel is a specific logical or physical communication link between assets in two separate zones. A conduit (represented by lines 302 and 304) is a logical group of communication channels between two or more devices and/or zones that share common security requirements. For conduits, a boundary device can be defined as a communication security asset (e.g., a network infrastructure device) that provides an interface between a zone and a conduit. As will be describe in more detail below, modeling tools provided by the security configuration system described herein can allow communication links to be defined between two specified devices (as represented by arrow 302), between a specified device and a zone of devices (as represented by line 306), or between two zones (as represented by arrow 304).

The modeling tools provided by the security configuration system 202 can allow a user to group their existing assets into security zones, define conduits between zones and/or devices, and define security requirements for the respective zones and conduits. The zones and conduits define trust relationships between devices and/or zones of devices, and may include nested or foreign zones. Channels define trusted communication links between devices. As will be described in more detail below, the security configuration system 202 described herein provides an intuitive interface with which the user can define these various trust relationships between their various industrial assets, and generates a suitable set of security configuration instructions for deployment to the user's industrial assets based on these defined trust relationships, thereby abstracting and simplifying the process of configuring the security parameters for each individual device.

Figure 4:
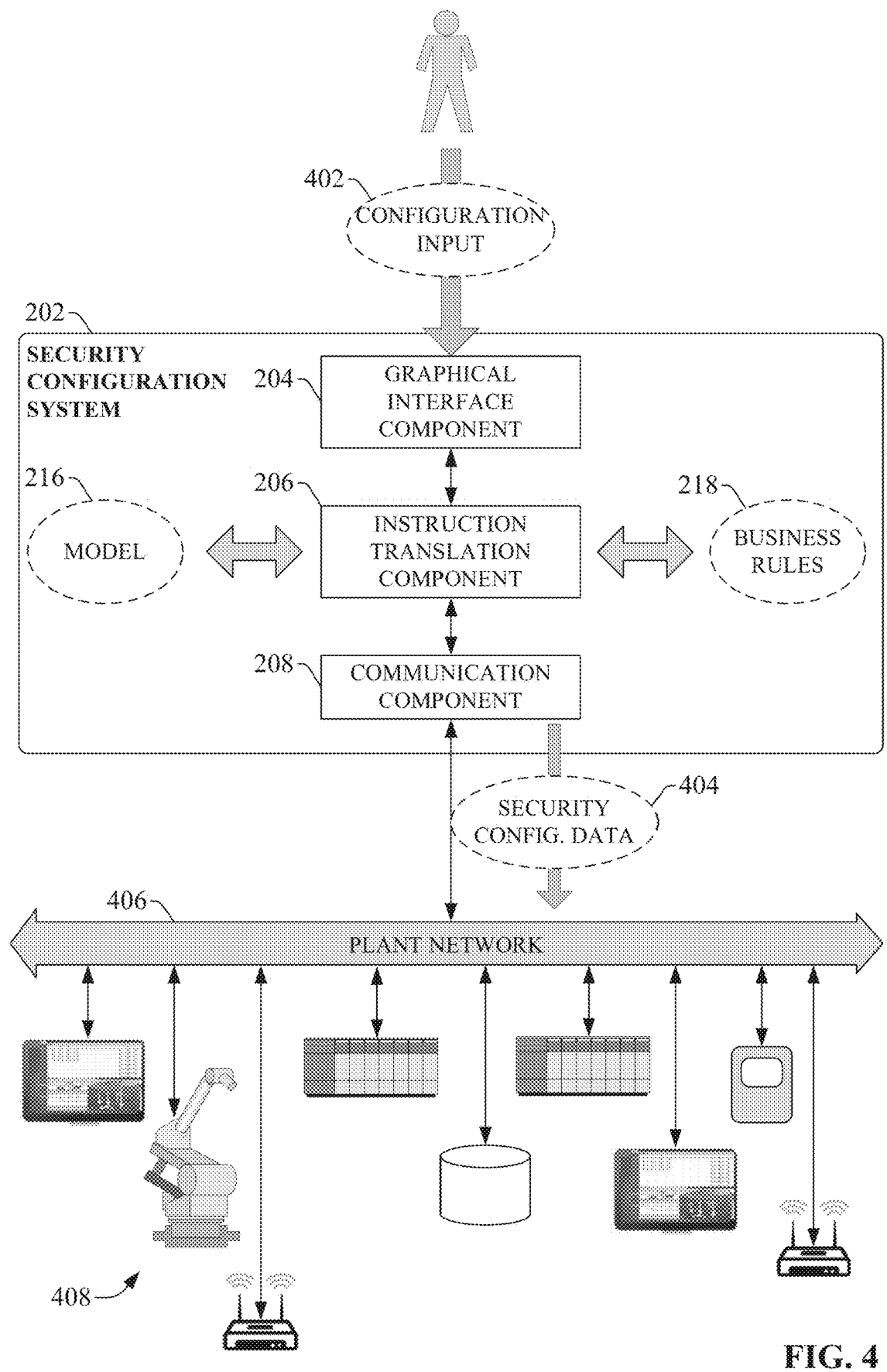
FIG. 4 is a diagram of an example system architecture that includes a security configuration system for configuration of plant-wide device security policies.

FIG. 4 is a diagram of an example system architecture that includes security configuration system 202 for configuration of plant-wide device security policies. In the illustrated example, a plant environment comprises a number of industrial assets and devices 408, which reside on a plant network 406. Plant network 406 may conform to any suitable networking protocol or combination of protocols, including but not limited to Ethernet, Ethernet/IP, DeviceNet, ControlNet, Data Highway and Data Highway Plus (DH/DH+), Remote I/O, Fieldbus, Modbus, Profibus, wireless networks, serial protocols, etc. The industrial devices 408 may comprise, for example, PLCs, motor drives (e.g., variable frequency drives), vision systems, safety relays, human-machine interface terminals, industrial robot controllers, data historians, work order tracking systems, or other such industrial assets. Industrial devices 408 can also include the network infrastructure devices (e.g., routers, hubs, switches, firewalls, etc.) that make up the backbone of the plant network 116 and which manage data transfer and security between network devices and network segments.

Security configuration using the security configuration system 202 is driven in part by model 216, which models the collection of industrial devices 408 and the networked connectivity between the devices. Model 216 can be generating using one or both of manual configuration or automatic device detection. To allow devices to be added to model 216, some embodiments of security configuration system 202 can maintain a database of industrial device definitions that can be manually or automatically selected and added to the model as needed. For manual configuration, the graphical interface component 204 may generate and display one or more device selection screens that allow the user to browse a stored database of devices according to one or more of device vendor, device model, device type, firmware revision, or other device identification information. For embodiments that include a device discovery component 210, the configuration system 202 can poll plant network 406 for industrial devices present on the network. In such embodiments, the device discovery component 210 can access device identification information present on a networked device (if the device supports auto-discovery) and update the model 216 to include the discovered device. In some embodiments, the device discovery component 210 can also retrieve any current device configuration information on the device (e.g., network address, pre-existing security parameters, etc.) that may be required by the system in order to generate security configuration instructions for the device or for other devices that will be communicating with the device.

Turning briefly to FIG. 5, the collection of industrial devices 408 can be viewed as a network of industrial devices 504 (e.g., devices D1, D2, etc.) and network infrastructure devices 502 that serve as the network backbone to facilitate communication between the devices. Model 216 represents this configuration of devices, and comprises a set of information identifying the industrial devices and network infrastructure devices that make up the collected set of industrial devices 408. An example model 216 may define each device in terms of the device vendor and model, the device's current software or firmware revisions, current network settings (e.g., network addresses), current security settings, and other relevant information.

Returning to FIG. 4, once the model 216 is configured to reflect the collection of industrial assets, the graphical interface component 204 can generate one or more trust definition screens that allow the user to submit configuration input 402 that further refines the model 216 by defining a plant-wide security strategy for the device. This can include defining permissible communication channels between zones and/or devices as well as defining event originator policies to be enforced by the devices that make up the industrial assets. The trust definitions screens provide an intuitive interface that allows the user to submit configuration input 402 that selectively groups the devices 408 into security zones, and to define any desired channels and/or conduits between devices and zones, thereby defining high-level security policies for the collection of industrial devices 408. The graphical interface component 204 can render these security policy definition displays in any format suitable for receiving the user-defined security definition information. For example, in some embodiments the system may render an interactive table that allows the user to define one or more security zones and to associate selected devices from the set of industrial devices 408 to respective zones. This interactive table can also allow the user to define one or more conduits between devices and/or zones by selecting the two endpoint devices or zones for the conduit. Example configuration tables will be described in more detail below.

In other embodiments, the graphical interface component 204 may render a graphical interface that allows the user to define the security policies by manipulating icons representing the industrial assets deployed on the plant floor. For example, in such embodiments the user may group devices into security zones by creating circles representing the zones, and dragging the device icons into the desired zones. To create channels and conduits, the graphical interface can allow the user to add arrows to the configuration view, and to assign the endpoints of the arrows to the appropriate devices or zone boundaries.

Figure 6A:
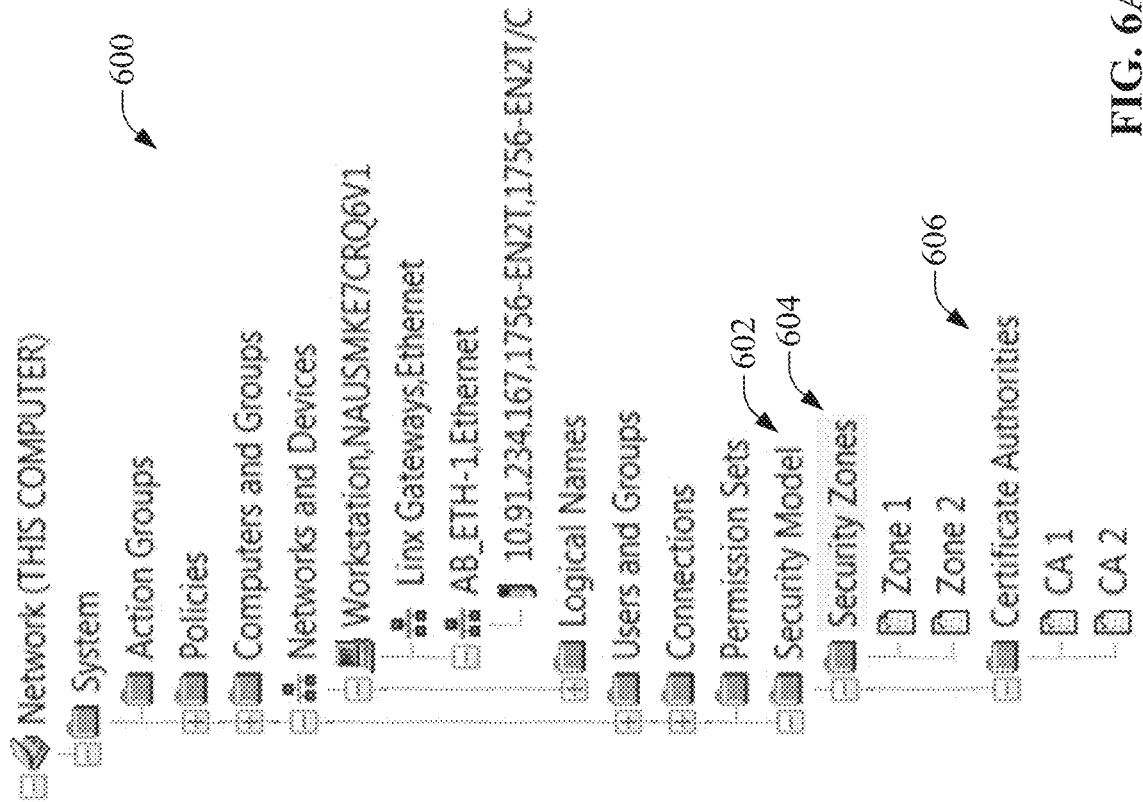
FIGS. 6A-6D are example configuration trees that can be rendered by a graphical interface component of a model-based security policy configuration system for display and configuration of security policies.
Figure 6B:
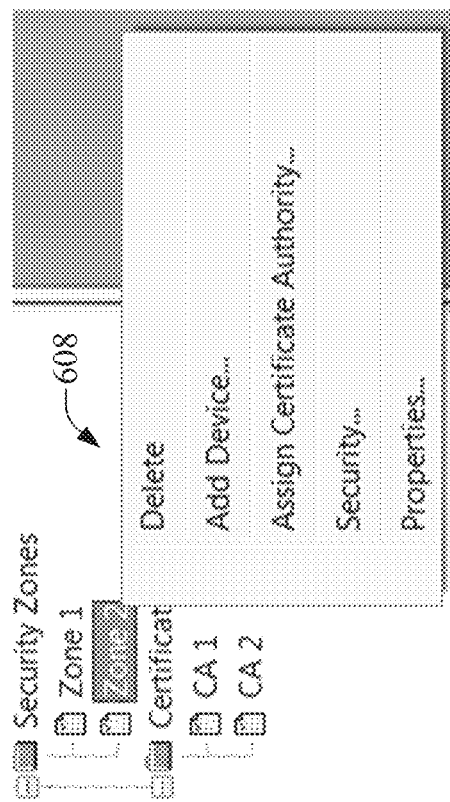

In still other embodiments, the graphical interface may render zones, devices, and other information as a hierarchical tree structure. In such embodiments, the interface may allow the user to create hierarchical nodes representing zones, and add devices to each defined Zone node as child nodes. The user can then set security attributes for each Zone and Device node (including defining any additional channels or conduits) using node-specific menus. FIGS. 6A-6D are example configuration trees that can be rendered by the graphical interface component 204 for display and configuration of security policies. In this example, the security configuration system is a component of a larger industrial asset management platform. As shown in FIG. 6A, configuration tree 600 includes a Security Model node 602, below which are a Security Zones node 604 and a Certificate Authorities node 606. Through interaction with the Security Zones node 604, a user can create any number of security zones. As shown in FIG. 6B, devices can then be added to each zone by invoking a pop-up menu 608 for a selected zone (e.g., by right-clicking on the selected zone's icon) and selecting a Add Device option, which can invoke a list of available devices that make up the set of industrial devices 408. The user can associate one or more devices with a zone by selecting the desired devices from this device list. Menu 608 also allows the user to assign a defined certificate authority to each zone, as well as to set other zone-level security attributes and properties for the zone. Zone-level attributes configured in this manner will be applied to all devices assigned to the zone, and these attributes will be recorded as part of the model 216.

Figure 6C:
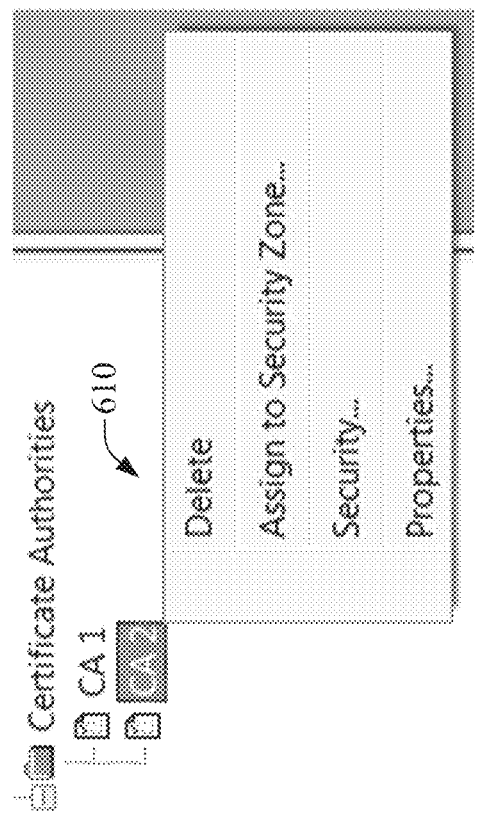

Example configuration tree 600 also allows the user to configure one or more certificate authorities through interaction with the Certificate Authorities node 606. As shown in FIG. 6C, the user may define any number of certificate authorities, and configure security attributes for each defined certificate authority by invoking a pop-up menu 610. Defined certificate authorities can then be assigned to any of the previously defined zones as part of the model 216, if such zones are to be configured for certificate-based security.

Figure 6D:
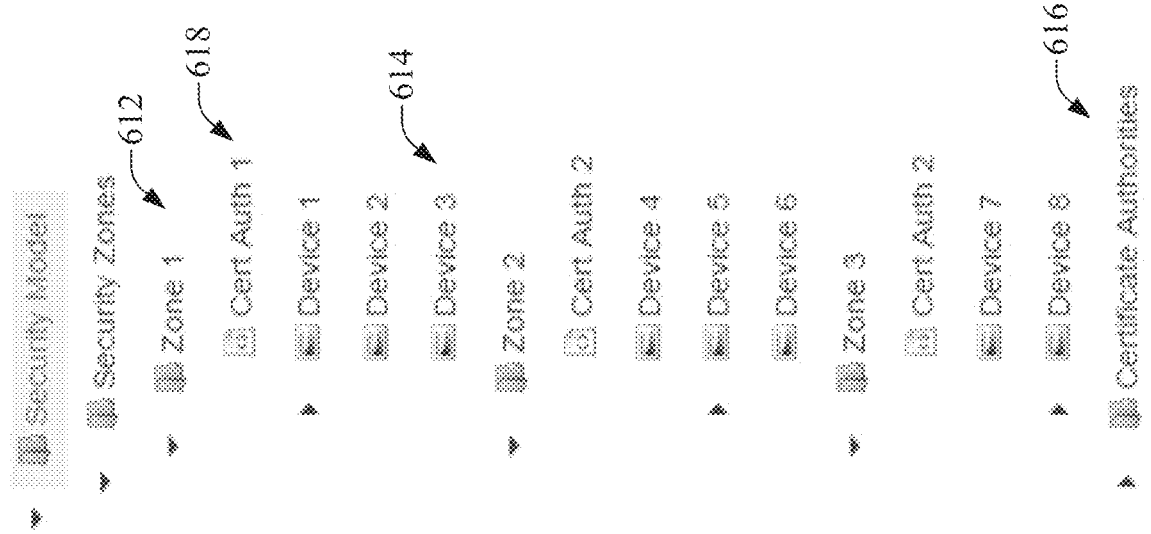

FIG. 6D is another example tree structure depicting the Zone nodes 612 expanded to display the devices associated with each zone, represented as Device nodes 614. In this example, the zones are configured to support certificate-based security, and as such each zone is associated with a selected certificate authority (defined under a Certificate Authorities node 616). Expanding a Zone node 612 also causes the certificate authority associated with that zone to be displayed as a CA node 618.

It is to be appreciated that embodiments of the security configuration system described herein are not limited to the tree-based configuration interfaces depicted in FIGS. 6A-6D. Rather, any suitable type of configuration interface—including but not limited to the table-based interface and icon manipulation interfaces described above—are within the scope of one or more embodiments of this disclosure.

Through interaction with the system's user interface, the security configuration system 202 allows the user to specify a number of different trust types for communication between the user's collection of industrial assets.

A Zone trust type specifies that all assets within the same security zone will trust one another. This trust type is represented by the circles enclosing the assets depicted in FIG. 3.

An Asset-Asset trust type specifies that an industrial asset in a first zone will trust an industrial asset in a different second zone. This trust type is represented by arrow 302 in FIG. 3.

An Asset-Zone trust type specifies that an asset in a first security zone will trust any asset from a specified second zone. This trust type is represented by arrow 306 in FIG. 3.

A Zone-Zone trust type specifies that any asset from a specified first zone is to trust all assets from a specified second zone. This trust type is represented by arrow 304 is FIG. 3.

For Asset-Asset, Asset-Zone, and Zone-Zone trust types, the system can further allow the user to define whether the trust is to be a one-way trust (only communication in one direction is allowed) or a two-way trust.

In one or more embodiments, these trust definitions represent "allow" rules; that is, the system allows the user to expressly define permitted data communications, and assumes that any type of communication not expressly allowed by a user-defined trust definition is to be considered a denied or unpermitted communication. In such embodiments, the system only requires security policies to be defined in terms of these "allow" rules, since the configuration system will configured the individual assets to deny any communication not expressly permitted.

Once one or more security zones have been defined, the graphical interface component 204 allows the user to define various zone-level security attributes for each zone. The configuration system will apply these zone-level security attributes to all devices within the zone. For example, the user may define the type of security to be used within each security zone. Example security types that may be configured for a zone include, but are not limited to, common industrial protocol (CIP) Security with Certificate, CIP Security with Pre-Shared Key (PSK), IP Block security, firewall rules, etc.

Selecting CIP Security with Certificate for a zone specifies that the selected zone contains devices that support CIP security, that share a common trust, and that have identities (certificates) issued by a specified trusted authority (e.g., a certificate authority defined by the user). When this type of security is set for a zone, the system also allows the user to select the identity of the certificate authority to be used in the zone (e.g., from a list of certificate authorities defined by the user).

Selecting CIP Security with PSK for a zone specifies that the selected zone contains CIP security devices that share a common pre-shared key. When this type of security is set for a zone, the system also allows the user to select a key attribute identifying a key to be used to enable communications within the zone. A given zone cannot be configured for both CIP security with Certificate and CIP Security with PSK.

Selecting IP Block security for a zone specifies that the selected zone contains industrial assets identified by individual IP addresses or a range of IP addresses. This type of security may be mixed with either CIP Security with Certificate or CIP Security with PSK in the same security zone.

The system can also allow the user to set other security attributes for a defined zone (e.g., allowed cipher suites, verify expirations, or other such security attributes). The system can also allow the user to set a number of attributes for the zone that are not specifically security related (e.g., disable HTTP, etc.).

In addition to zone-level attributes, the system also allows the user to set a number of asset-level attributes. These attributes are applied to specific industrial assets and devices. In some scenarios, some or all of these asset-level attributes may be read automatically by the configuration system as part of a device auto-discovery routine (implemented by the device discovery component 210). These manually provided or automatically discovered asset-level attributes are encoded in the model 216 together with the zone-level attributes. Asset-level attributes may include, for example, an asset type attribute used to classify the device and to render the device's capabilities in the model 216, port attributes that specify one or more mechanisms by which the asset communicates with other assets (e.g., specifying that the asset is to communicate via its Ethernet port, and setting an IP address for the device), or other such attributes.

As the industrial devices 408 are defined and grouped into security zones (and any desired conduits between devices and/or zones are defined), the model 216 is updated to record the set of industrial assets and the security relationships therebetween, as defined by the zones, conduits, channels, and any other zone-level and/or asset-level security attributes set by the user. The instruction translation component 206 translates the high-level, user-defined security policies—as defined by the zone, channel, and conduit definitions—into security configuration data 404 that can be sent to individual assets and devices to facilitate implementing the plant-wide security strategy. To this end, the instruction translation component 206 is preconfigured with a set of underlying translation rules designed to analyze the model 216, determine a set of vendor-specific device security configuration instructions that will implement the user-defined security policies, and deploy these security configuration instructions to the respective industrial assets and devices to facilitate setting the appropriate device-level security parameters necessary to implement the desired plant-wide security strategy.

For example, if the plant-wide security strategy encoded in model 216 requires modification of a firewall configuration parameter on a firewall device residing on the plant network 406 (e.g., to either allow or block communication between two devices in accordance with the user's zone and conduit definitions), the instruction translation component 206 will generate a security configuration instruction formatted in accordance with the particular device vendor and device model of the firewall device, and designed to perform the necessary parameter modification on the firewall device. The communication component 208 then deploys this instruction over the plant network 406 to the firewall device to effectuate the modification. Other example security configuration actions that may be implemented by the security configuration instructions may include modifying network addresses (e.g., IP addresses) or network address ranges on selected devices, enabling specific security modes on selected devices, enabling key-based or certificate-based security protocols in selected devices, distributing encryption keys or certificates to devices to facilitate secure communication (e.g., if the devices or zones are configured for key- or certificate-based security), updating one or more whitelists that explicitly identify devices that are permitted to communicate with a given device, modifying router or switch settings, or other such actions. The instruction translation component 206 generates such security configuration instructions for all necessary device-level security parameter changes required to implement the security strategy defined by the user-defined zone and conduit specifications. Since a given set of heterogeneous industrial assets may support different security technologies, the system is capable of implementing the defined global security strategy using more than one security enforcement technology for a given set of industrial devices.

Since the instruction translation component 206 is preconfigured with translation instructions for a variety of different device vendors, the security configuration system 202 can implement the user's specified security strategy even if the collection of industrial assets is made up of devices from multiple different vendors. The security configuration system 202 thus provides the user with a simple, vendor-agnostic interface for defining a plant-wide security strategy for a collection of industrial assets, and translates this strategy into a set of vendor- and device-specific security configuration instructions which are then deployed to the appropriate devices. By abstracting the user from the device-specific technical details of configuring security settings and modes for each individual device, the system mitigates the need for the user to possess an in-depth technical knowledge of specific device types and vendors in order to configure device-level security as part of a larger, plant-level security strategy.

In one or more embodiments, instruction translation component 206 can also generate some portions of the security configuration data based further on global or user-defined business rules 218 maintained by the security configuration system 202. These business rules 218 can enforce one or more high-level preferences or constraints relating to configuration of security policies between zones and devices. For example, business rules 218 may define that devices made by two specified product vendors cannot be part of a common security zone that uses PSK security due to conflicts between those two vendors' products. In general, certain security configuration requests may not be enforceable due to technical conflicts between device models or device vendors, and business rules 218 can define such conflicts. Based on these encoded business rules 218, the instruction translation component 206 can determine when the user's configuration input 402 has requested an unenforceable security policy, and generate suitable feedback notifying the user that the requested policy cannot be implemented.

Business rules 218 can also define criteria to be used to resolve scenarios in which there are multiple ways to configure the industrial devices 408 to implement a requested security policy. In an example scenario, the user may group a subset of industrial assets within a common security zone with no channels or conduits designated between the zone and other defined zones, thereby implementing a security policy whereby the subset of industrial assets are permitted to exchange data with one another while communication with other devices within the industrial environment (outside the security zone) is to be prohibited. Based on the particular combination of industrial assets and network architecture devices that make up the networked system, the networked connections between the devices, and the models and/or vendors of the respective devices (all of which can be determined by the system 202 based on analysis of the model 216), the instruction translation component 206 may determine that there are multiple configuration possibilities for implementing this security strategy. For example, there may be more than one set of security settings for a particular firewall device or router that will deny external communication requests directed to the assets within the zone. Accordingly, the instruction translation component 206 can select one of the available approaches based on one or more resolution criteria defined by the business rules 218.

In another example, the system may determine that it is possible to implement a requested security strategy by reconfiguring either of a first device or a second device, and the business rules 218 may define a rule that assists the system 202 to select the device reconfiguration option that best conforms to a defined preference (e.g., a preferred device vendor, a preference for key-based security over certificate-based security, etc.). In various embodiments, the business rules 218 may define explicit preferences for configuration approaches (e.g., a preferred type of security, a preferred device vendor to be used for filtering of communications, etc.) or may define one or more constraints to be applied when resolving configuration conflicts (e.g., an instruction to select a strategy requiring the fewest number of device reconfigurations).

In some embodiments, business rules may also identify potential conflicts between enforcement solutions before or after such solutions are deployed. In such embodiments, the system may perform real-time monitoring of the devices involved in the security policy to ensure that subsequent re-configurations of the devices do not conflict with a previously established security policy. For example, after deployment of a security strategy by the system, whereby secure communication between two devices is established, a user may use an independent configuration tool to reconfigure a network infrastructure device (e.g., a firewall) in such a way as to block communications between the two devices, inadvertently conflicting with the security policy previously established by the security configuration system. Based on the model and the business rules, the system may detect such re-configurations, determine that the re-configuration conflicts with the previously defined security policy, and perform an action in response to this determination. The action may comprise, for example, delivering a notification message to one or more personnel responsible for administering the security strategy, automatically returning the affected device to its previously configured security settings (i.e., over-riding the re-configuration), or other such actions. In this way, the modeling tool and business rules can enforce defined security policies in real-time, easily identifying policy conflicts that would otherwise be difficult to track.

FIGS. 7-13 and the associated descriptions below illustrate a number of example security strategies that can be implemented using the security configuration system 202.

Figure 7B:
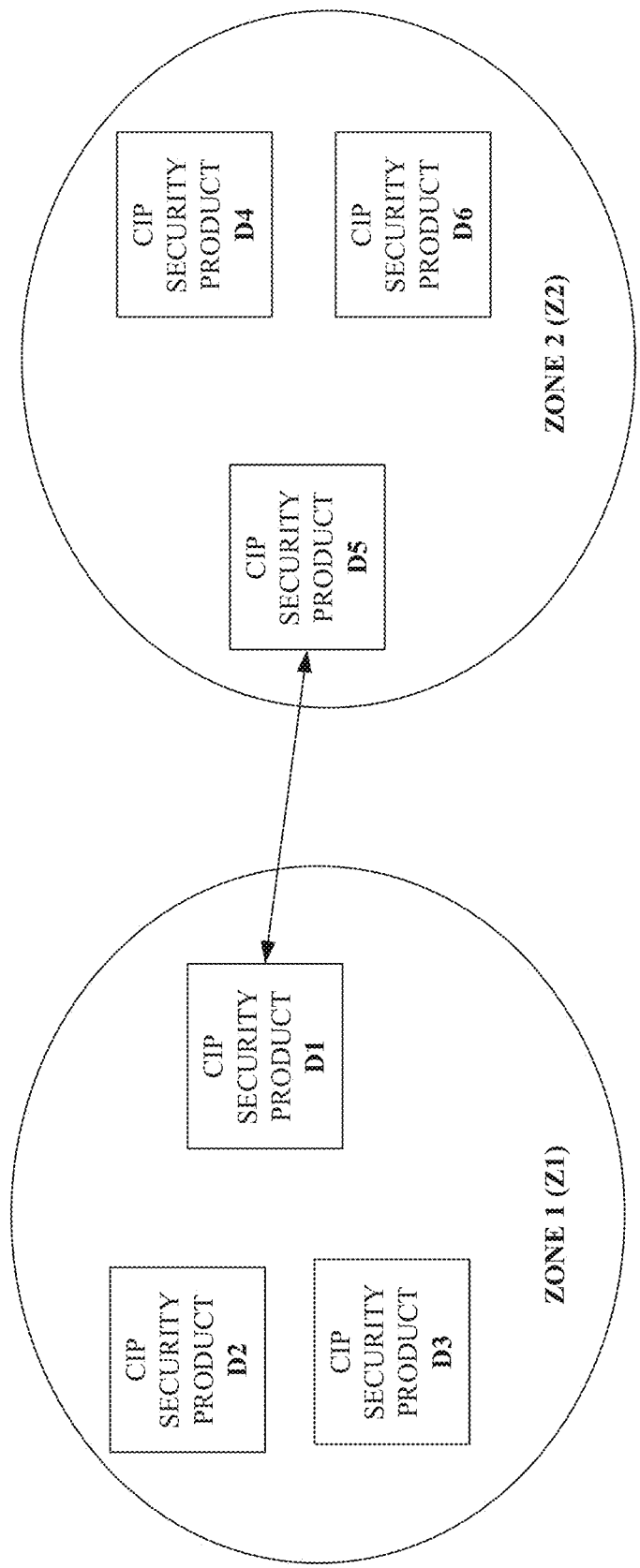
FIG. 7B is a diagram depicting the security strategy implemented by the security policy configuration system in accordance with the user-provided configuration input depicted in FIG. 7A.

FIGS. 7A and 7B depict a security policy comprising two security zones and an asset-to-asset conduit, in which all assets comprise devices that support CIP security. FIG. 7A is a table illustrating configuration input provided to the security configuration system 202 by a user in order to implement the security policy. As noted above, this configuration input can be received via interaction with one or more user interface displays generated by the graphical interface component 204, where the interface displays can conform to any suitable format in accordance with various embodiments. In one or more embodiments, the graphical interface component 204 may display one or more tables similar in format to those depicted in FIG. 7A. For example, the graphical interface component 204 may generate and display a Zone Definition table 702 for entry of zone definition information, and a Conduit Definition table 706 for entry of conduit definition information. The Zone Definition table 702 may include fields for assigning a zone name to a new zone, selecting a type of security to be used within each zone (e.g., user certificate, PSK, whitelist, etc.), indicating whether I/O and/or messaging within the zone is to be secure, and other such zone-level definitions. The Conduit Definition table 706 may include fields for assigning a conduit name for each conduit to be created, and identifying the two end point devices for which communication is to be allowed.

A Device Definition table 704 may include information defining the inventory of industrial assets and devices for which the plant-wide security strategy is to be implemented. For embodiments that support auto-discovery, at least some of this device information may be discovered automatically by the device discovery component 210, including but not limited to asset catalog numbers and current IP addresses, and indications as to whether each device supports CIP security. Alternatively, some or all of the industrial asset information may be manually provided to the system 202 by the user.

As also noted above, as an alternative to interactive tables, the zone and conduit information may be defined by the user via manipulation of graphical icons presented by the graphical interface component 204. In such embodiments, the graphical interface may have a format similar to that depicted in FIG. 3 (or FIG. 7A), in which the industrial assets are represented by icons, and the user can define security zones represented by circles that group the asset icons into zones. This graphical interface can also allow the user to create one-way or two-way arrows between zones, between a zone and a device, or between devices in order to define channels and conduits.

In yet another interface example, some or all of the information depicted in FIG. 7A may be provided through interaction with a hierarchical tree structure, such as those depicted in FIGS. 6A-6D.

Once the user has provided definitions for zone groupings and any desired conduits, the model 216 is updated to reflect these security preferences. The instruction translation component 206 then generates and deploys appropriate device-level, model- and vendor-specific security configuration instructions to any of the devices determined to require reconfiguration in order to implement the specified plant-wide security strategy. FIG. 7B is a diagram depicting the security strategy implemented by the system in accordance with the user-provided configuration input depicted in FIG. 7A. In this example, the industrial assets comprise six devices D1-D6 that are grouped into two zones Z1 and Z2 (as indicated in the Device Definition section of FIG. 7A). The devices all support CIP security, and so are capable of exchanging data securely. In accordance with the zone groupings defined by the user, the instruction translation component 206 generates and deploys any device-level security configuration instructions necessary to allow devices D1-D3 to securely exchange data with one another in accordance with their Zone 1 designation, and to allow devise D4-D6 to securely exchange data with one another in accordance with their Zone 2 designation. In this example, both Zone 1 and Zone 2 devices are configured to use PSK security for data exchange, in accordance with the zone-level security types specified by the user (see the Zone Definition table 702).

In addition, the user has defined a conduit between devices D1 and D5, which reside in different zones. A conduit can be considered a group of one or more one-way channels between two assets or zones. In this example, the conduit is a two-way communication permission between devices D1 and D5. Similar to the zone definitions, when the user defines a conduit between devices D1 and D5 (as indicated by the Conduit Definition table 706, in which D1 and D5 are identified as endpoints of the conduit), the instruction translation component 206 generates and deploys appropriate device-level security configuration instructions to any of device D1, device D5, and/or any intermediate network architecture devices (e.g., hubs, routers, switches, firewalls, etc.) in order to allow devices D1 and D5 to securely exchange data in accordance with the conduit definition. Since all assets in this example, support CIP security, data exchange between the designated devices is secure.

Since devices D1-D6 (as well as any intermediate network infrastructure devices) may comprise devices made by different device vendors, the instruction translation component 206 will—based on analysis of model 214—identify the devices that require new security settings, determine the vendor and/or model information of those devices, and generate suitable vendor- and model-specific security configuration instructions for the respective devices. The instruction translation component 206 can generate these vendor-specific instructions based on underlying translation code maintained and executed by the security configuration system 202. In this way, the system allows the user to define a vendor-agnostic, plant-wide security strategy at a high level, abstracting the user from the vendor- and device-specific technical details associated with configuring device settings on each individual device.

Figure 8B:
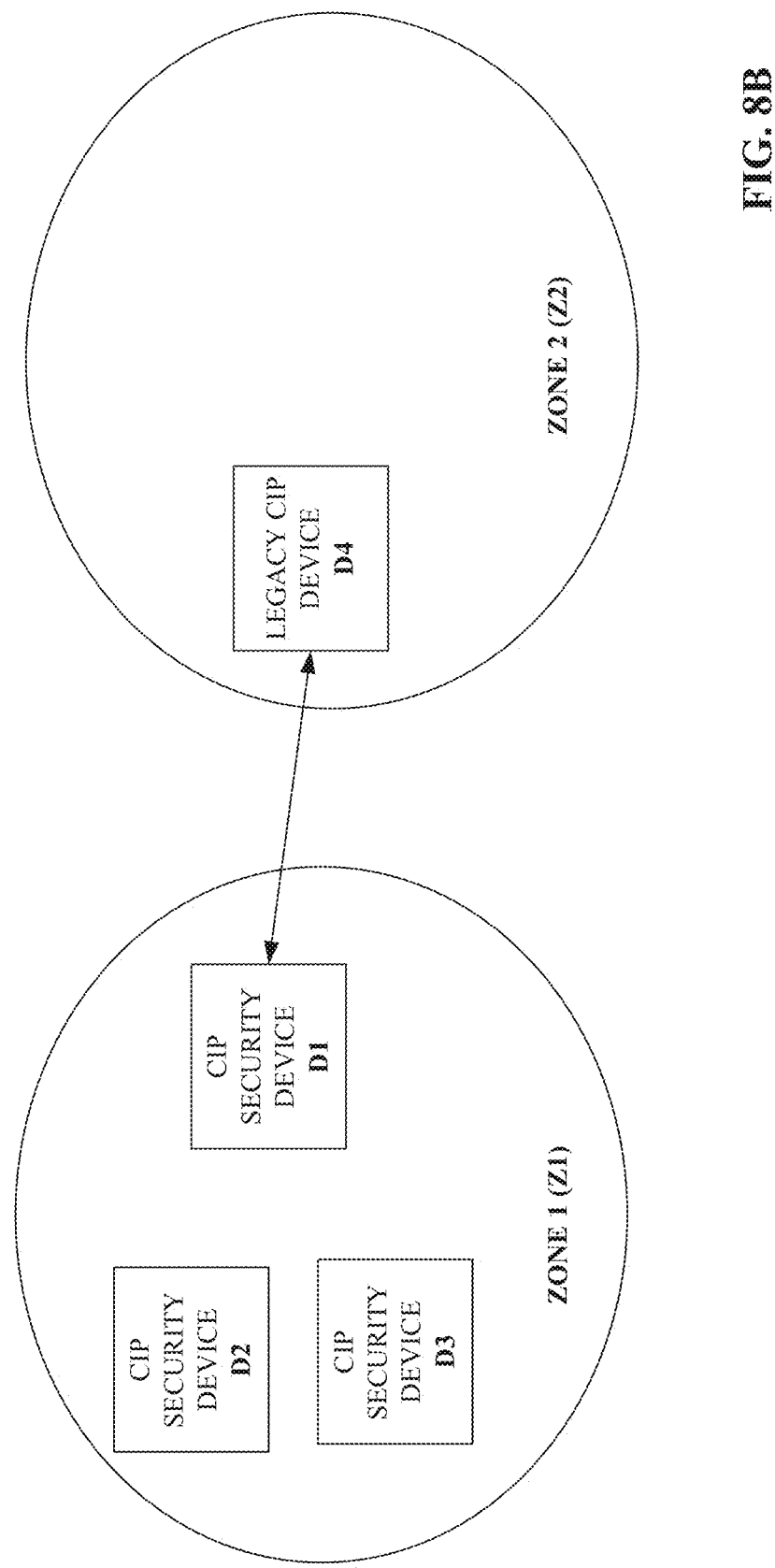
FIG. 8B is a diagram depicting the security strategy implemented by the security policy configuration system in accordance with the user-provided configuration input depicted in FIG. 8A.

FIGS. 8A and 8B illustrate another example security strategy that can be implemented by security configuration system 202. FIG. 8A is a table illustrating example user configuration input that can be provided to (or, in some cases, automatically discovered by) security configuration system 202, and FIG. 8B is a diagram representing the security policy. In this example, devices D2-D3 all support CIP security and are assigned to the same zone (Zone 1). Device D4, assigned to Zone 2, is a legacy product that does not support CIP security. An asset-to-asset conduit has been defined to allow communication between device D1 and legacy device D4. Since devices D1-D3 support CIP security, data exchange between these devices is performed securely. Since device D4 does not support CIP security, data exchange between D1 and D4 is permitted by virtue of the defined conduit between those two devices, but is not secure.

Figure 9B:
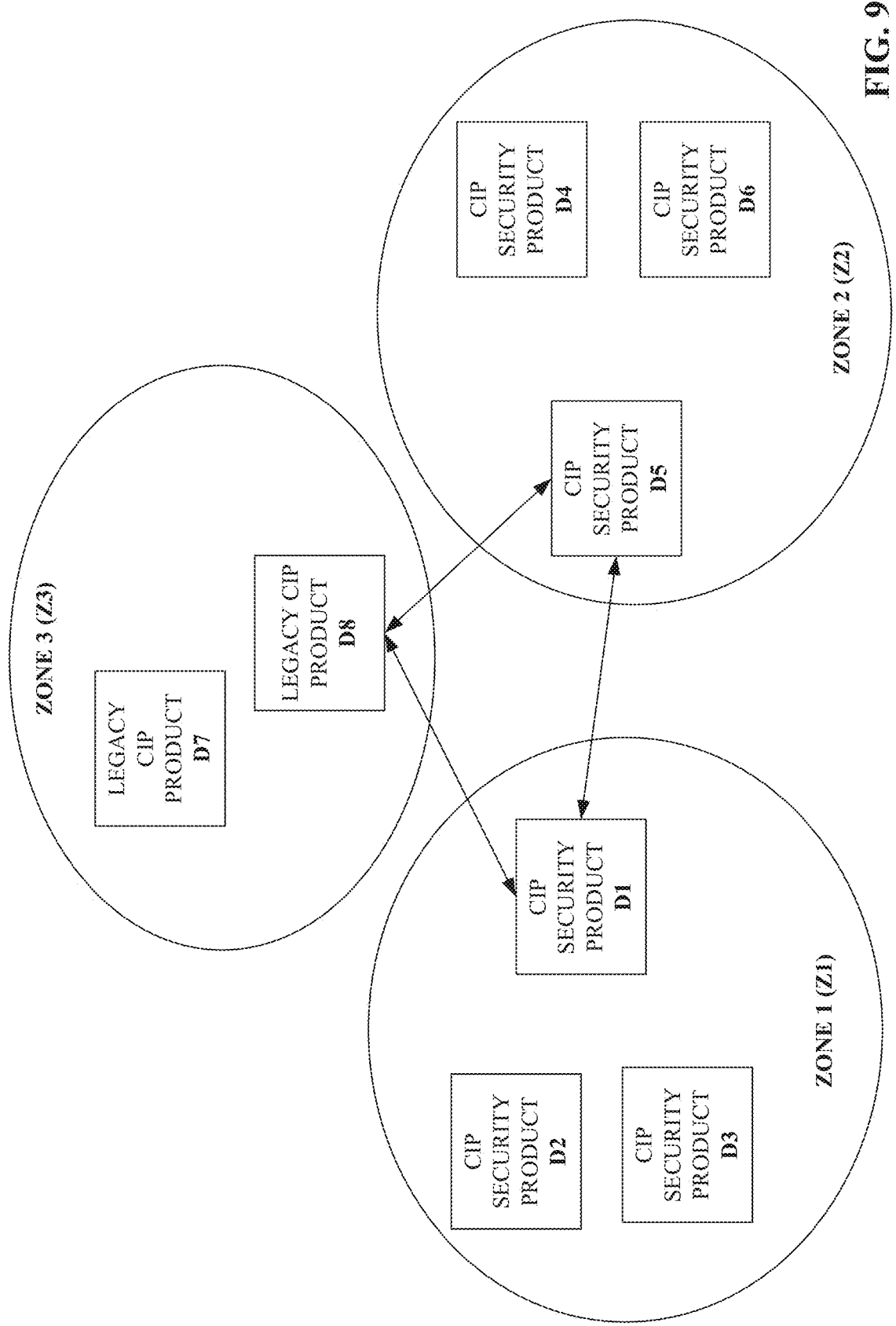
FIG. 9B is a diagram depicting the security strategy implemented by the security policy configuration system in accordance with the user-provided configuration input depicted in FIG. 9A.

FIGS. 9A and 9B illustrate another example security strategy that can be implemented by security configuration system 202. FIG. 9A is a table illustrating example user configuration input that can be provided to (or, in some cases, automatically discovered by) security configuration system 202, and FIG. 9B is a diagram representing the security policy. In this example, the industrial assets comprise a mix of devices that support CIP security and that do not support CIP security (legacy devices). Three security zones have been defined, with devices D1-D3 assigned to Zone 1, D4-D6 assigned to Zone 2, and legacy devices D7 and D8 assigned to Zone 3. When this policy is implemented, the devices in each of Zones 1 and 2 can communicate securely with other devices in the same zone, while Devices D7 and D8 can communicate with each other without security.

Three asset-to-asset conduits have been defined in this scenario. D1 and D5 have been configured to communicate securely with one another. Two non-secure communication paths—between D5 and D8 and between D1 and D8—have also been established in accordance with the user's configuration input. Since D8 is a legacy device that does not support CIP security, these two conduits are unsecure, but asset-to-asset communication to this device is still permitted.

Figure 10B:
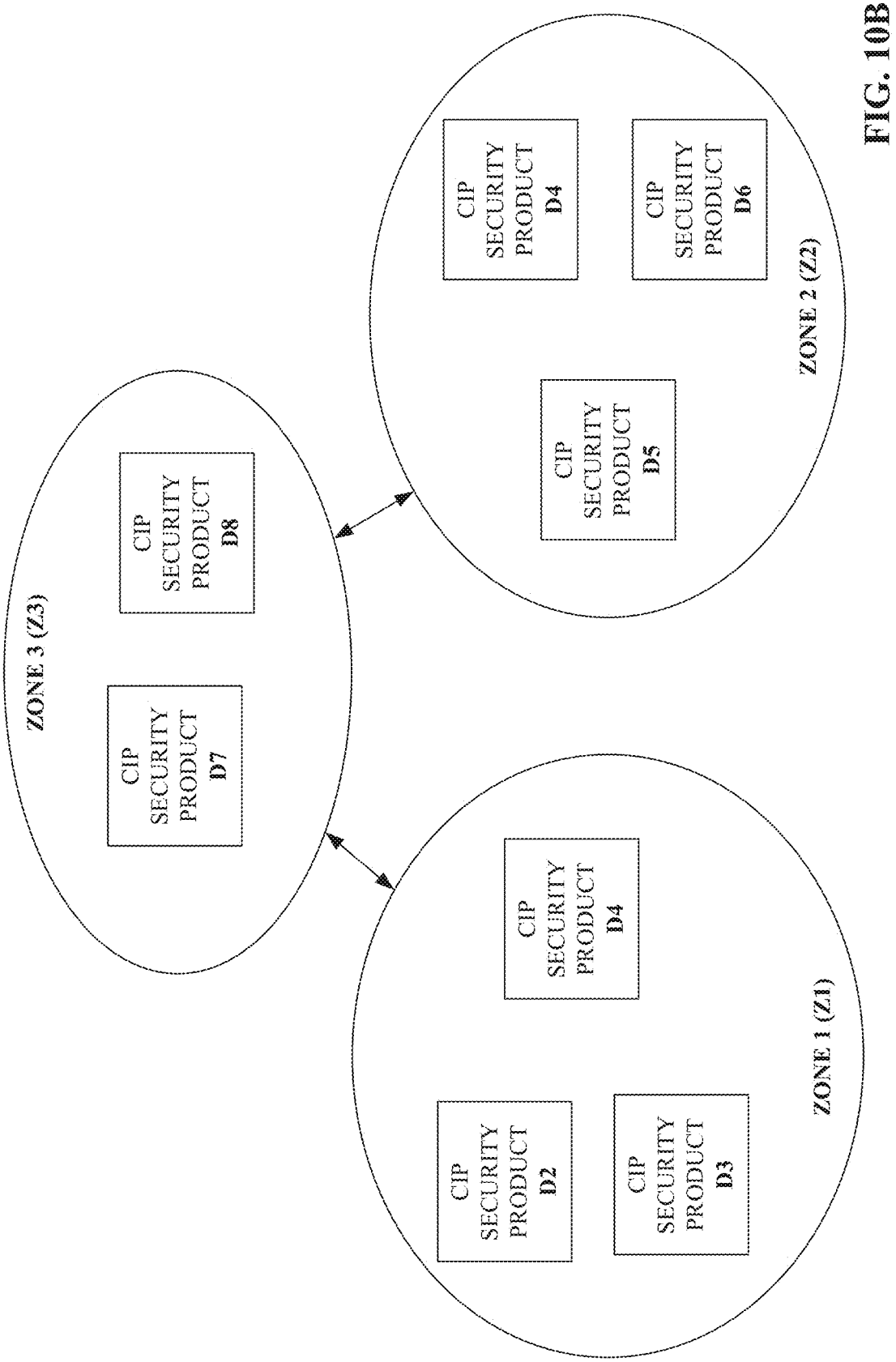
FIG. 10B is a diagram depicting the security strategy implemented by the security policy configuration system in accordance with the user-provided configuration input depicted in FIG. 10A.

FIGS. 10A and 10B illustrate another example security strategy that can be implemented by security configuration system 202. FIG. 10A is a table illustrating example user configuration input that can be provided to (or, in some cases, automatically discovered by) security configuration system 202, and FIG. 10B is a diagram representing the security policy. This example illustrates configuration of zone-to-zone conduits by the system. Industrial assets D1-D8 have been segregated into three security zones, as described in previous examples. In addition to the intra-zone communication permitted by the zone groupings, two zone-to-zone conduits have been configured—a first conduit between Zones 1 and 3 and a second conduit between Zones 2 and 3. As can be seen in the table of FIG. 10A, a zone-to-zone conduit is defined by specifying the zones that are to be permitted to communicate as the two endpoints of the conduit.

A zone-to-zone conduit specifies that all devices within a first zone are to be permitted to communicate with any device within a second zone. Depending on a preferred type of security specified by the user configuration input, the instruction translation component 206 may implement these zone-to-zone conduits by updating a whitelist on firewall devices at zone boundaries, appropriately configuring the IP addresses of the devices in the respective zones, distributing public and/or private keys or certificates to the appropriate devices to permit secure communication between the devices, or other such configuration actions. In the present example, all zones are configured to use certificate-based security, in accordance with the user's specification. However, the system allows the user to individually select the type of security (e.g., certificate, PSK, whitelisting, etc.) for each defined zone. Devices and zones can be configured to use different types of security if desired, provided the mix of security types is enforceable given the specific collection of industrial assets to be configured.

Figure 11B:
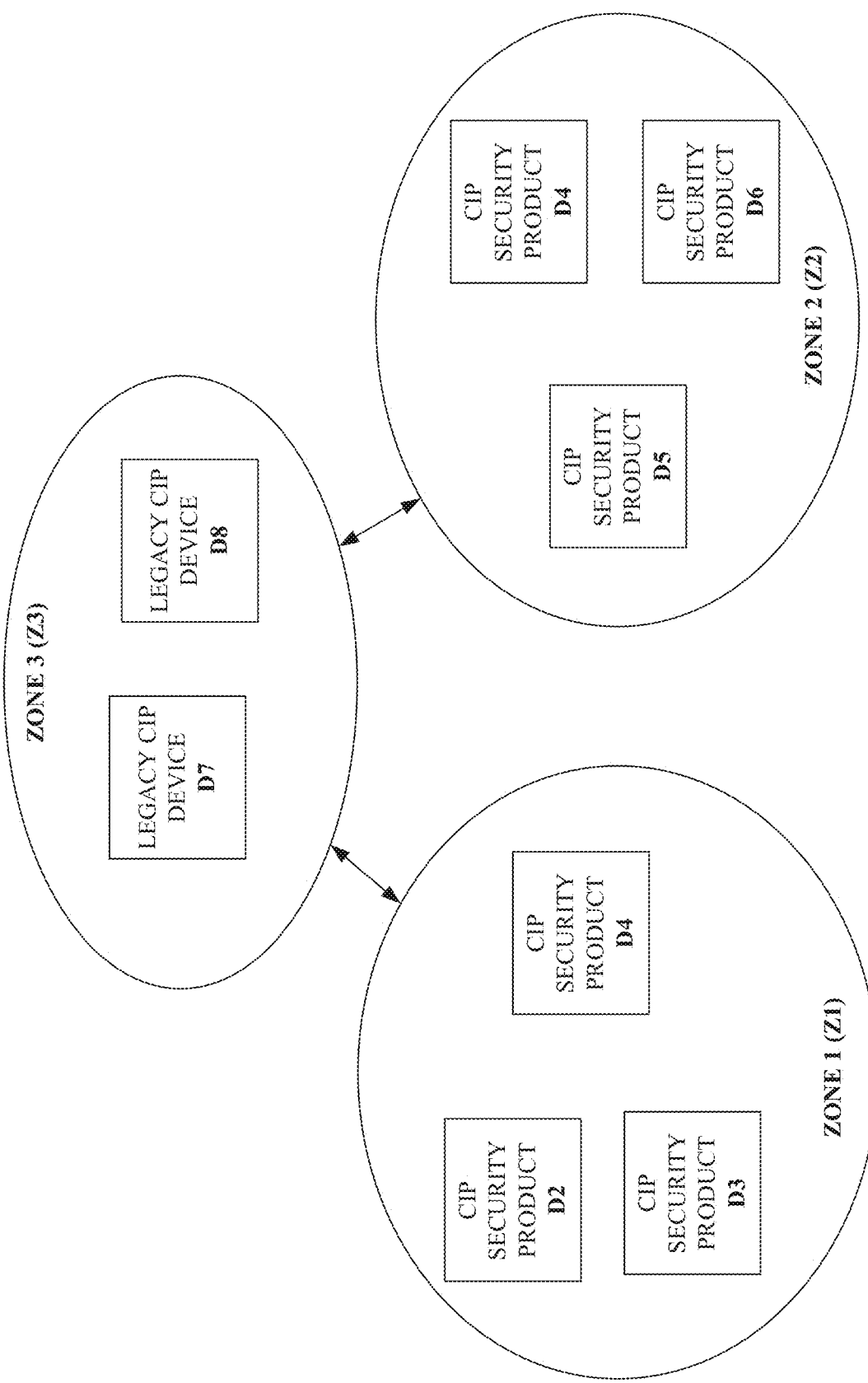
FIG. 11B is a diagram depicting the security strategy implemented by the security policy configuration system in accordance with the user-provided configuration input depicted in FIG. 11A.

FIGS. 11A and 11B illustrate another example security strategy that can be implemented by security configuration system 202. Similar to the example described above in connection with FIGS. 10A and 10B, three zones and two zone-to-zone conduits have been defined. In this example, the assets comprise a mix of devices that support CIP security and legacy devices that do not support CIP security, with the legacy devices assigned to Zone 3. As can be seen in the configuration table of FIG. 11A, no security is configured for Zone 3 due to the limitations of the legacy devices.

Figure 12B:
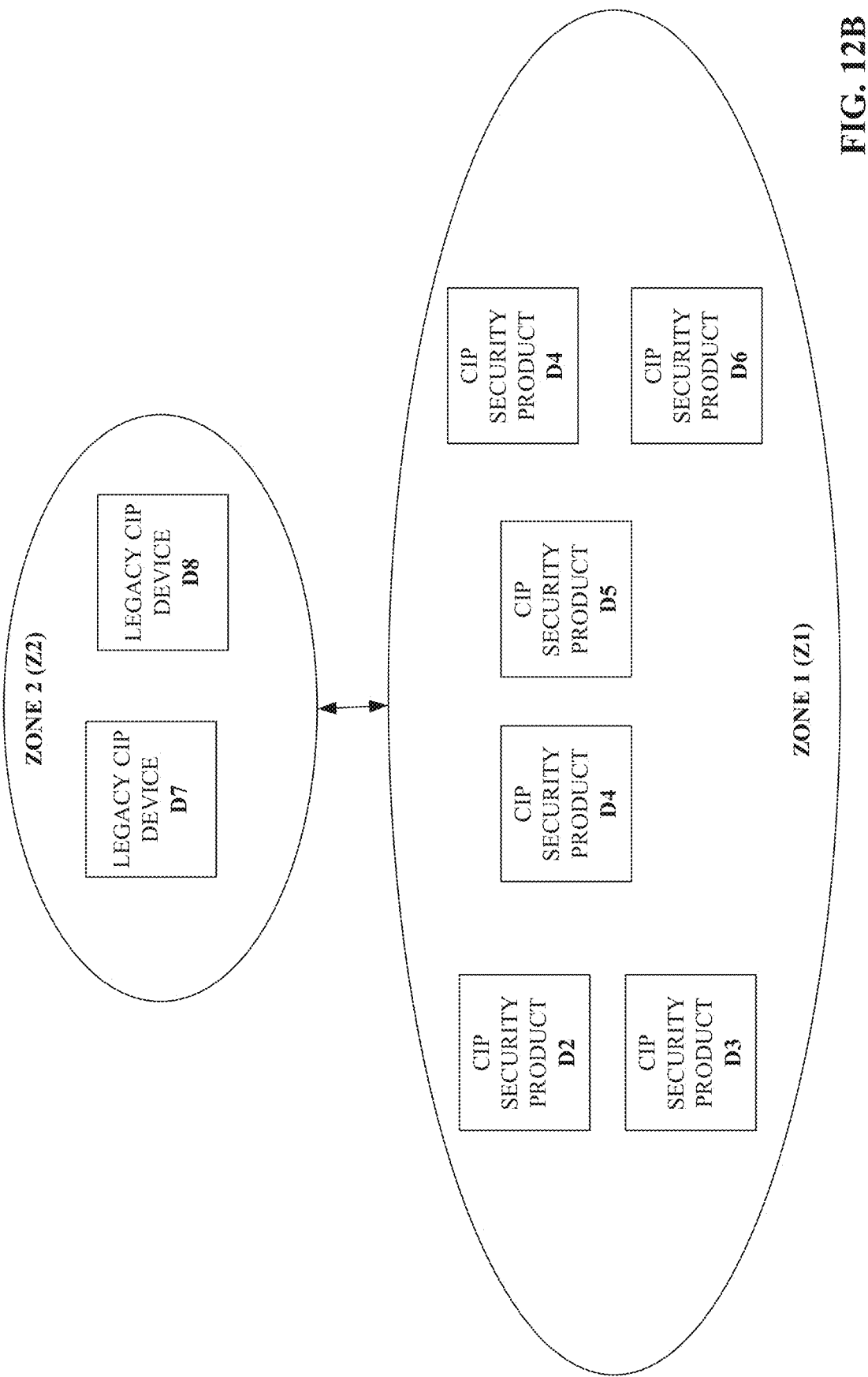
FIG. 12B is a diagram depicting the security strategy implemented by the security policy configuration system in accordance with the user-provided configuration input depicted in FIG. 12A.

FIGS. 12A and 12B illustrate another example security strategy that can be implemented by security configuration system 202. This example depicts two zones, with a set of devices supporting CIP security assigned to Zone 1 and a pair of legacy devices that do not support CIP security assigned to Zone 2. In addition, a zone-to-zone conduit is configured to allow communication between the zones. In this example, Zone 1 is configured to allow secured communication between its devices using vendor certificate security. The zone-to-zone conduit allows communication between the Zone 1 and Zone 2 devices, which is unsecured due to the inability of the legacy devices to support CIP security.

Figure 13B:
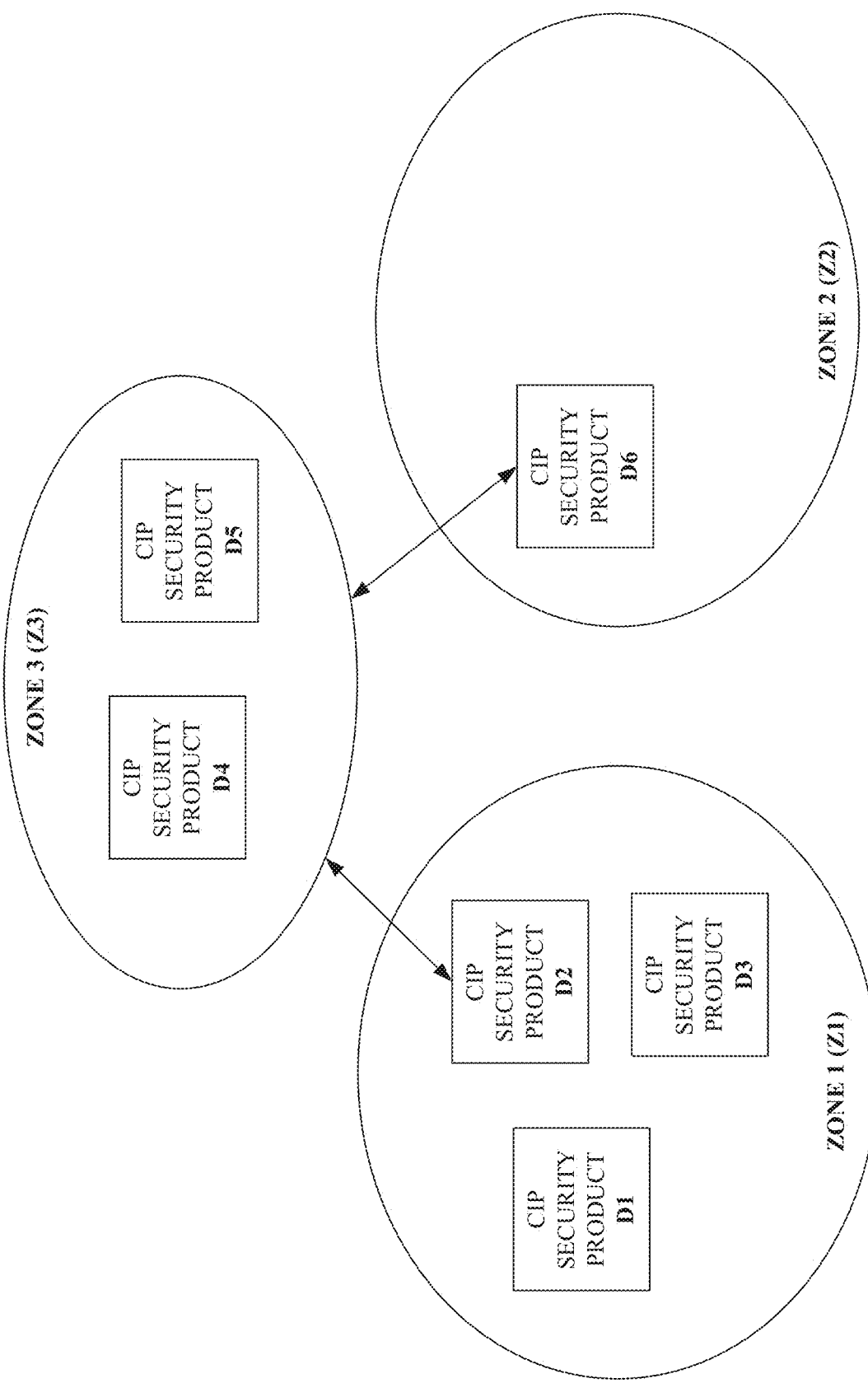
FIG. 13B is a diagram depicting the security strategy implemented by the security policy configuration system in accordance with the user-provided configuration input depicted in FIG. 13A.

FIGS. 13A and 13B illustrate another example security strategy that can be implemented by security configuration system 202. Similar to some previous examples, the set of industrial assets are grouped into three zones. In this example, two asset-to-zone conduits have also been defined—a first conduit between device D2 to Zone 3, and a second conduit between device D6 and Zone 3. As shown by the conduit configuration data depicted in FIG. 13A, each asset-to-zone conduit is defined by identifying the asset and the zone that make up the respective endpoints of the conduit. This configuration allows devise D2 and D6 to securely communicate with any of the devices in Zone 3, while preventing the other devices in Zone 1 (D1 and D3) from communicating with any of the devices in Zone 3 or Zone 2. Devices within each zone are configured to securely communicate with each other by virtue of the zone definitions, which are configured to use user certificate security for intra-zone data exchanges.

It is to be appreciated that the configurations depicted in FIGS. 7-13 are only intended to be exemplary and non-limiting, and that the system can facilitate implementation of any enforceable security policy that can be defined in terms of zones and conduits for a given collection of industrial assets making up one or more industrial automation systems. As noted above, the system is capable of making determinations as to whether a requested security policy, or portion of a requested security policy, is enforceable given the collection of assets for which security is to be implemented. Policy requests that are determined to be non-enforceable (e.g., due to improper mixes of requested security types, inability of one or more devices to support a requested security configuration, mixes of device vendors that are not capable of communicating or sharing a common security policy, etc.) will be detected by the system during configuration, and the system will notify the user if a requested configuration is not capable of being implemented.

Figure 14:
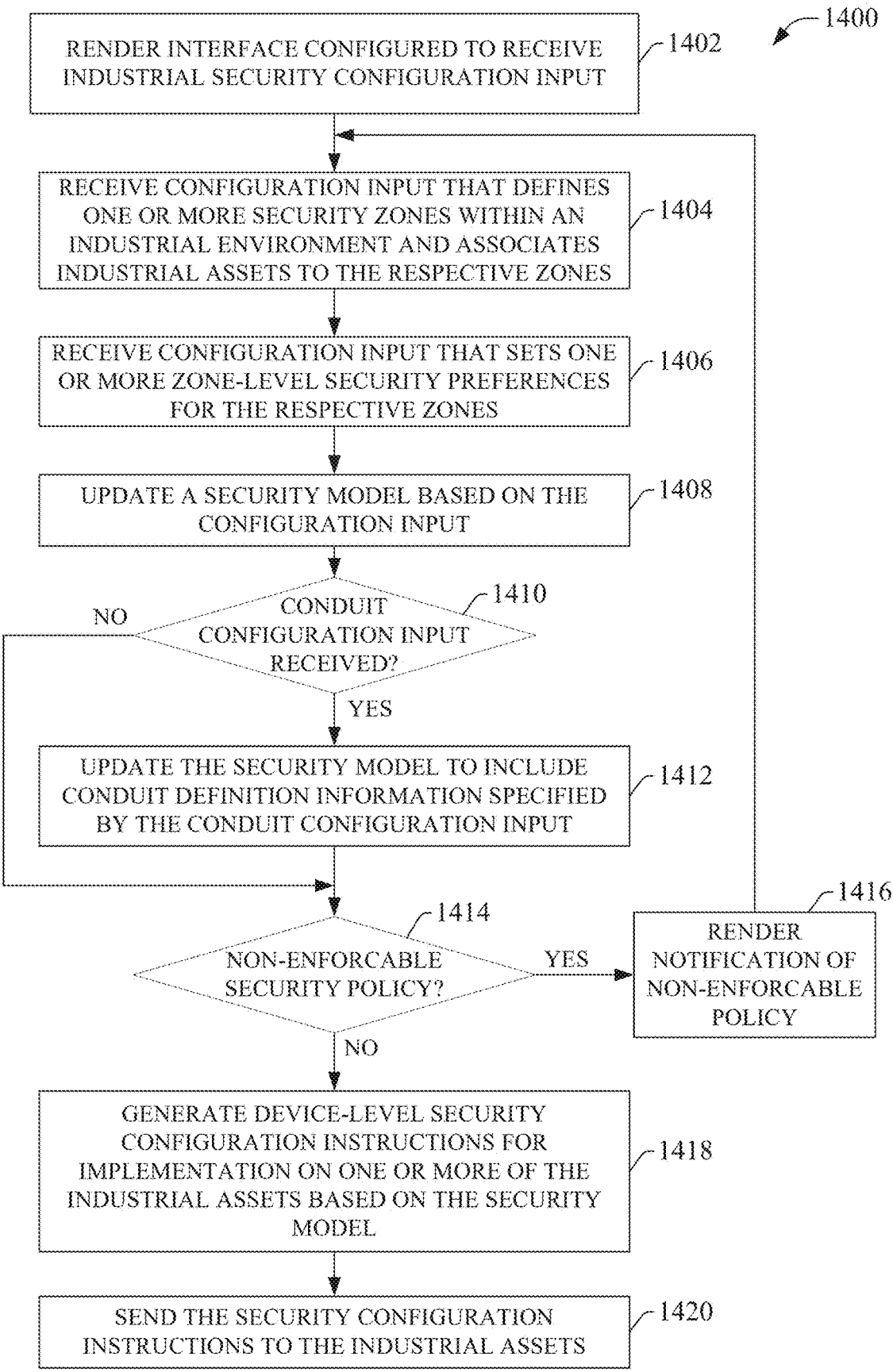
FIG. 14 is a flowchart of an example methodology for configuring and implementing a plant-wide security strategy using a model-based industrial security configuration system.

FIG. 14 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14 illustrates an example methodology 1400 for configuring and implementing a plant-wide security strategy using a model-based industrial security configuration system. Initially, at 1402, an interface is rendered that is configured to receive industrial security configuration input. In one or more embodiments, this interface may comprise an interactive hierarchical tree structure that allows the user to define one or more security zones as nodes of the tree structure, and to assign respective industrial assets making up an industrial system to the respective zones as child nodes under the zone nodes. In another example, the interface may comprise one or more tables that allow the user to enter security zone definition information in tabular format. Such tables may also tabulate the industrial assets that comprise the industrial system for which a security policy is to be configured, and allow the user to associate each device with a defined zone by entering appropriate data table values. In still other example embodiments, the interface may comprise an interactive icon-based graphical display that allows the user to assign devices to selected security zones via manipulation of graphical icons representing the various industrial assets. For example, the interface may allow the user to drag-and-drop industrial asset icons to selected circles representing defined security zones, thereby associating the icons with the selected zones.

At 1404, configuration input is received via the interface that defines one or more security zones within an industrial environment, and associates industrial assets to the respective zones (e.g., using one of the example techniques described above for entering this security configuration input). Each zone defines a group of industrial assets that share common security requirement (defined by zone-level security attributes set via the interface), and which are permitted to exchange data with one another. At 1406, further configuration input is received that sets one or more zone-level security preferences for the respective zones. For example, using the interface, the user may define, for each zone, a type of security to be used for intra-zone data communication between industrial assets within that zone (e.g., user certificate, vendor certificate, PSK, whitelisting, etc.).

At 1408, a security model is updated based on the configuration input received at steps 1404 and 1406. This model records information regarding the industrial assets that make up the industrial system or plant for which a security policy is to be implemented (e.g., device models, device types, network addresses, device capabilities, etc.), network infrastructure devices that comprise the backbone of the networks on which the industrial assets reside, connectivity information between the assets and network infrastructure devices, the zone definitions specified by the configuration information, and/or other such information.

At 1410, a determination is made regarding whether conduit configuration input has been received via the interface. If such conduit configuration input has been received (YES at step 1410), the security model is further updated at step 1412 to include conduit definition information specified by the received conduit configuration input. This conduit configuration input may specify one or more of an asset-to-asset conduit, an asset-to-zone conduit, or a zone-to-zone conduit. In one or more embodiments, the interface may allow the user to define a conduit by identifying the two endpoints of the conduit, where each endpoint may comprise a device or a zone. A conduit specifies a permitted line of communication between the two specified endpoints.

Once the conduit configuration input has been received and the security model is updated, or if no conduit configuration is received (NO at step 1410), the methodology moves to step 1414, where a determination is made (based on an analysis of the security model) regarding whether any of the configuration input received at steps 1404, 1406, or 1410 define a non-enforceable security strategy. Non-enforceable security strategies may include, for example, requests to apply a set of security requirements to an asset that is not capable of supporting the specified security requirements, requests to allow secure data communication between two industrial assets that are not capable of sharing information, or other such non-enforceable policies. If the system identifies one or more non-enforceable policies based on the analysis of the security model (YES at step 1414), the methodology moves to step 1416, where the interface renders a notification of the one or more non-enforceable policies, and returns to step 1404 to allow the user to modify any of the previously entered configuration data in order to eliminate the non-enforceable policy. In one or more embodiments, the system may generate one or more recommendations based on the previously provided configuration data for modifying the configuration requests in a manner that yields an enforceable plant-wide security policy.

Once the security model has been completed and has been determined to comprise only enforceable security policies (NO at step 1414), the methodology proceeds to step 1416, where the system generates a set of device-level security instructions for implementation on one or more of the industrial assets. These security configuration instructions are generated based on an analysis of the security model, which in turn is generated based on the configuration input provided by the user. In one or more embodiments, the system that generated the interface at step 1402 maintains a translation engine capable of converting the security policy configuration information provided in previous steps into device- and vendor-specific security configuration instructions that, when executed on the individual target assets, will implement the plant-wide security strategy defined in previous steps. These configuration instructions may comprise, for example, network address settings, whitelist entries, instructions to enable selected device-level security features, security key or certificate information, messages indicating to one or more devices a certificate authority that should be used for secure communications, firewall device settings, or other such instructions. The system's translation engine can include knowledge of the types and formats of security configuration instructions supported by a range of different device types and vendors, allowing the system to appropriately map the security policies defined by the model to a set of vendor- and model-specific device-level security configuration instructions in order to implement the defined security policy. At 1420, the security configuration instructions are sent to the appropriate industrial assets on the plant floor (e.g., via the plant network).

Although the examples described above focus primarily on model-based configuration of secure communications policies defining permissible data communication between industrial devices 408, the model 216 can also be used to configure and distribute security event management policies to be enforced by the industrial devices 408. In this regard, the model 216 generated as described above groups the collection of industrial devices 408 that make up an industrial environment into security zones, and further defines any conduits between zones and/or devices deemed necessary for operation. In some embodiments, the security configuration system 202 can also receive user definitions of security event management policies to be applied to respective zones defined by the model 216, translate these security event policies to device-specific configuration data, and deploy this configuration data to the relevant devices 408.

In general, a security event is an activity or action on the control layer—e.g., an unauthorized activity or an activity that may be indicative of a security violation—that initiates a notification or countermeasure by an industrial device. As an example security event that can cause an industrial device or asset to initiate a notification or countermeasure, a malicious outside party may attempt to connect to the plant network and remotely access a secured industrial device in an attempt to acquire proprietary production information or to tamper with an industrial process carried out by the device. Although the attempt may be blocked by the device—e.g., due to the outside party's lack of security credentials—the attempt may be detected by the device, which can generate a notification directed to appropriate plant personnel reporting of the unauthorized access attempt. As another example of a security event, a device may be configured to monitor for indications of overloaded data traffic on the control network (or a specified portion of the network), which may suggest a that an outside party is attempting a denial-of-service attack on the network. In response to detecting this elevated level of data traffic (e.g., an amount of data communication activity in excess of a defined threshold indicative of abnormal data traffic), the device can generate a notification directed to appropriate plant personnel reporting of the possible denial-of-service attack. An unauthorized attempt to modify a control parameter, or an attempt to modify the control parameter outside of an approved range, may also be handled as a security event. In general, an industrial device, or collection of industrial devices, can be configured to monitor for and recognize a variety of security activities or events, and to generate suitable notifications directed to a system administrator, a server, or another entity reporting of these security events.

Typically, devices must be configured individually to recognize security events of interest and to generate notifications in response to detection of these events. Consequently, as the number of devices within a plant environment that can generate security events increases, it becomes more challenging for system administrators to effectively manage event generation policy at each endpoint device in a manner that balances consistency with the need to tune security event policy for specific needs.

Embodiments of the security configuration system 202 can address this issue by allowing a system administrator to centrally manage security event originator devices by leveraging the zone and conduit security model 216 described above for distribution and enforcement of security event policy. In this regard, model 216 can serve as a device grouping construct that simplifies the administration of security events using a centralized system, without requiring the system administrator to separately configure respective individual devices.

Figure 15:
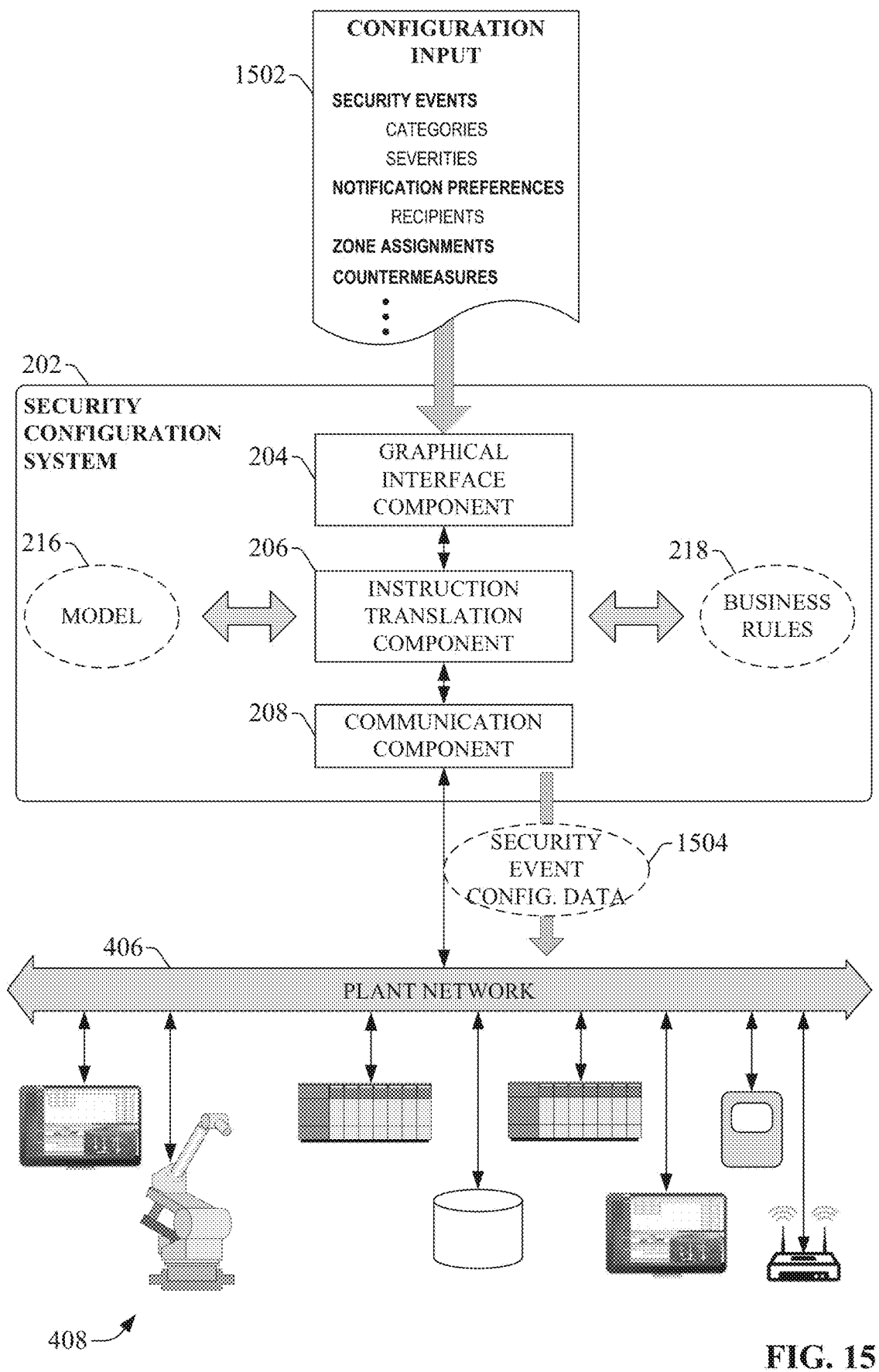
FIG. 15 is a diagram of an example system architecture that includes a security configuration system for system-level management of security event policies.

FIG. 15 is a diagram of an example system architecture that includes security configuration system 202 for system-level management of security event policies. As in the example depicted in FIG. 4, the plant environment comprises a number of industrial devices 408 residing on plant network 406. In this example, it is assumed that model 216 has been created using the techniques described above, and models the collection of industrial devices 408 and the networked connectivity between the devices. In some embodiments, model 216 may define each device 408 in terms of the vendor and model of the device 408, the device's current software or firmware revisions, current network settings (e.g., network addresses), current security settings, or other relevant information. It is also assumed that the user has submitted further configuration input 402 (see FIG. 4) that defines one or more zones and selectively groups the industrial devices 408 according to the zones, as described in previous examples. The user may also have defined one or more asset-asset, asset-zone, or zone-zone conduits representing further communication trust types to be enforced.

With this model 216 in place, the user can submit security event configuration input 1502 to the security configuration system 202 that describes system-level security event policies that are to be enforced by the industrial devices 408, and that assigns selected security event policies to respective security zones defined by the model 216. To this end, graphical interface component 204 can generate and display, on a client device, one or more interactive security policy definition interfaces that allow the user to submit security event configuration input 1502 describing the desired high-level security event management policies. In this regard, the system 202 can allow the user to define these security event policies in terms of events to be monitored, notification preferences for notifying selected entities in response to detection of a security event, zone assignments indicating which defined security zones are to be assigned an event policy, countermeasures to be carried out by the devices 408 in response to detection of a security event, or other such event policy characteristics. The instruction translation component 206 translates these system-level, user-defined security event policies into a set of device-level configuration instructions that, when executed on their respective industrial devices 408, configure those devices 408 to carry out the defined security event policies. Communication component 208 deploys these device-level configuration instructions to their respective target devices 408 (e.g., via plant network 406) as security event configuration data 1504 to facilitate configuring the devices 408 accordingly. In this way, security configuration system 202 abstracts device-level management for implementation of security event handling to the system-level, allowing the system administrator to define a system-level security event handling strategy which is then applied to the device level by the system 202.

The interface displays generated by graphical interface component 204 can be configured to receive, as configuration input 1502, any suitable system-level security event properties for translation into device-level configuration instructions. For example, the user can submit configuration input 1502 that defines the security events that should be monitored and reported by one or more of the industrial devices 408. Such events can include, but are not limited to, attempts to remotely access an industrial device 408 or automation system within the plant facility, an increase in data traffic in excess of a defined threshold indicative of a denial-of-service attack on the control network, an impermissible modification to a control or security parameter, an impermissible change to a control setpoint outside defined limits, or other such events.

If the response to a detected security event is to be a function of the severity of the event, the user can also define, for the event, different severity levels to be associated with different types of responses to the event. In an example scenario, the user may define that a first notification is to be sent to a first sent of entities in response to detecting that data traffic on a control network has exceeded a first threshold, and that an elevated notification is to be sent to an expanded set of recipients in response to detecting that the data traffic has exceeded a higher second threshold.

In some embodiments, configuration input 1502 can also define event categories, assign one or more defined events to each category, and define a notification preference or countermeasure to the category as a whole. In this way an event response can be applied to multiple types of events under a common event category. In general, embodiments of system 202 can allow the user to define security events at substantially any level of granularity, in terms of the event descriptions, categories, severities, etc.

Configuration input 1502 can also comprise notification preferences associated with each defined event, event category, event severity, or other event characteristic. A notification preference can specify the type of notification to be generated in response to detection of the associated security event (e.g., email, text message, log entry, etc.), one or more recipients or entities to whom the notification is to be delivered, a server to which the event should be reported (e.g., a server of a secure operations center), a frequency at which the notifications should be generated if the notifications are to be sent periodically until the detected security event has been addressed, or other such notification preferences.

In some embodiments, the system 202 can also allow the user to define, as part of the configuration input 1502, a countermeasure to be carried out by the industrial devices 408 in response to detection of a security event. Example countermeasures may include, for example, modification of a communication or security parameter on a firewall device or industrial device 408, disabling communications to or from a specified device, disabling a communication port on a specified device, changing an operating mode of an automation system (e.g., switching to a safe operating mode in response to detection of a security event that could render the automation system unsafe), or other such countermeasures that can be carried out by the network and/or industrial devices 408.

Figure 16:
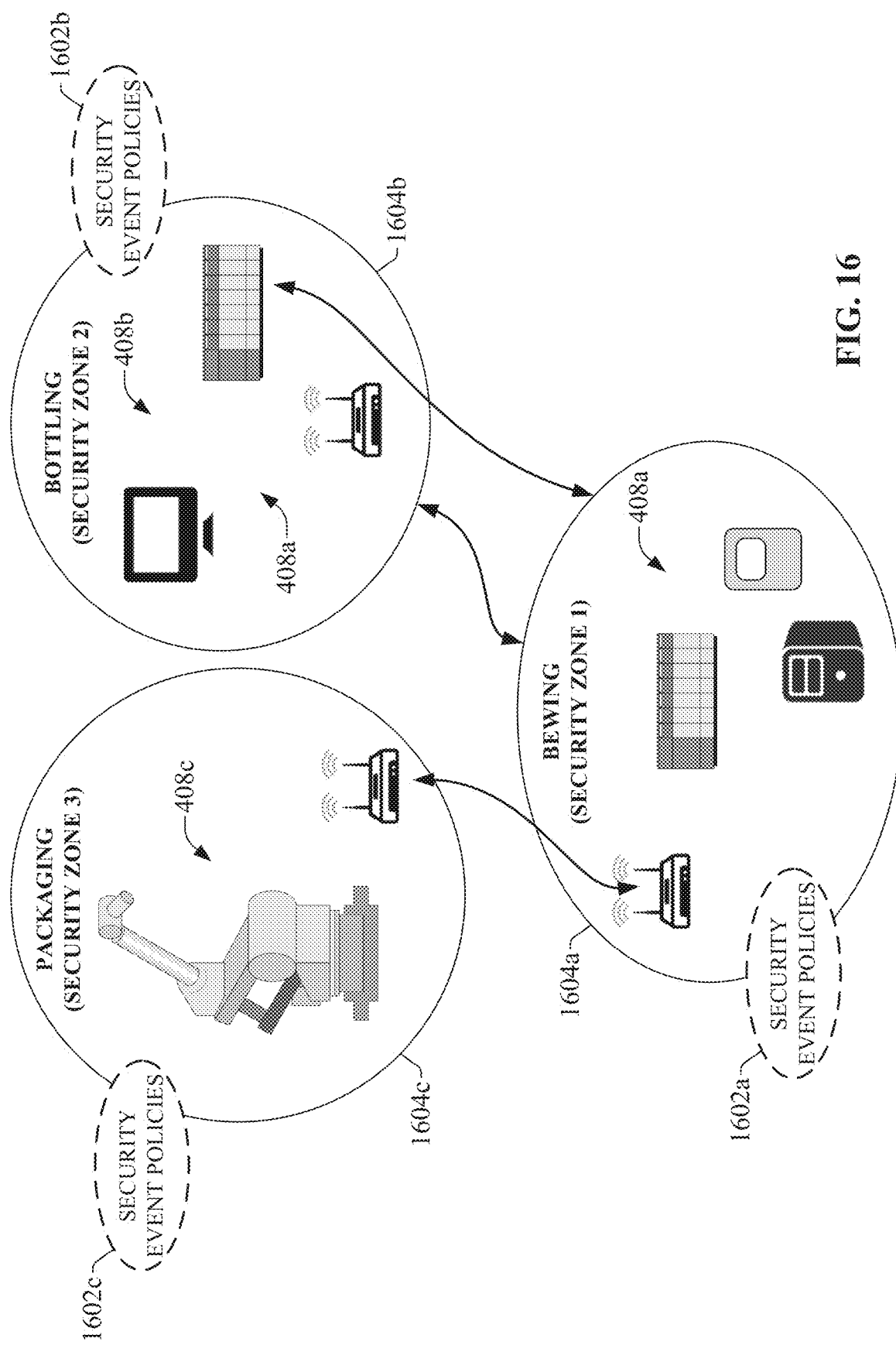
FIG. 16 is a diagram illustrating assignment of security event policies to respective security zones.

Since model 216 defines a segregation of the industrial environment into zones comprising related sets of industrial assets and devices 408, the system 202 can allow the user to define system-level security event policies relative to the security zones defined and recorded in the model 216, thereby assigning system-level security event management policies to specified zones. Assignment of a security event policy to a defined zone will cause the system 202 to apply the defined policy exclusively to the selected zone. In this way, system 202 allows the user to define separate security event handling guidelines to each zone individually. FIG. 16 is a diagram illustrating assignment of security event policies 1602 to respective security zones 1604. In this example, the industrial facility is a brewing plant, and model 216 has been generated to define groupings of industrial assets and devices 408 within the plant into three security zones 1604a-1604c, using techniques described above for defining and modeling trust zones. These zones 1604 correspond to different production areas of the plant—a brewing area (security Zone 1), a bottling area (security zone 2), and a packaging area (security zone 3). As described in previous examples, each zone 1604 has been assigned a subset of the industrial devices 408 that operate within the production area corresponding to the zone.

Security configuration system 202 can leverage the zone information defined in the model 216 to allow the user to assign different sets of zone-specific security event policies 1602 to the respective zones 1604. In an example implementation, graphical interface component 204 can generate and display, on a client device communicatively connected to the system 202, graphical interfaces that render configuration tools for defining security event policies 1602 for each zone 1604 defined in the model 216. In some embodiments, these interface displays can render interactive configuration trees similar to those depicted in FIGS. 6A-6D, which include nodes corresponding to each zone 1604 defined in the model 216 (e.g., Zone nodes 612). Selection of one of these Zone nodes can invoke a pop-up menu 608 for the selected zone, which can include a selectable option for defining security event policies for the selected zone (submitted as configuration input 1502). These example interfaces are only intended to be exemplary, and it is to be appreciated that any suitable graphical interface that renders interactive tools for configuring system-level security event policies or rules for a selected security zone is within the scope of one or more embodiments of this disclosure.

Returning to FIG. 16, each set of security event policies 1602 can define, for its corresponding zone 1604, the security events to be monitored in the zone 1604 (e.g., unauthorized attempts to remotely access a device 408, an increase in data traffic on an indicated control network in excess of a defined threshold, an attempt to perform an impermissible modification to a control or communication parameter, etc.), notification preferences for reporting of the event in response to detection, any countermeasures to be carried out by one or more of the industrial devices 408 in response to detection of the event (e.g., disabling of a communication port, blocking communications to a specified device, etc.), or other such information. System 202 allows the user to define separate sets of system-level security event rules or policies 1602a-1602c for the respective security zones 1604a-1604c, and will apply the policies 1602 defined for a given zone 1604 exclusively to that zone.

Returning to FIG. 15, once the user has submitted security event configuration input 1502 defining all desired security event policies for respective zones defined by the model 216, instruction translation component 206 translates these system-level, user-defined security event policies into security event configuration data 1504 that can be sent to individual industrial and networking devices 408 to facilitate implementing the security event management policies in the respective zones. To this end, the instruction translation component 206 is preconfigured with a set of underlying translation rules designed to analyze the model 216 and the security event configuration input 1502, determine a set of vendor-specific device configuration instructions that will implement the user-defined security event policies, and deploy these security event configuration instructions as configuration data 1504 to the respective industrial and networking devices 408 to facilitate setting appropriate device-level security and notification parameters necessary to implement the desired security event handling strategy for all defined zones.

For example, if the defined security event policy for a given zone requires that the amount of data traffic on a particular portion of the control network should be monitored for increases characteristic of a denial-of-service attack, the instruction translation component 206 can identify properties of the portion of the network to be monitored based on analysis of model 216. This analysis can include determining the subset of devices 408 that are connected to the relevant portion of the network and that are capable of monitoring and reporting the data traffic on that portion of the network. If multiple devices 408 are determined to be capable of monitoring and reporting of the data traffic on the network, instruction translation component 206 can select one of the candidate devices 408 using a suitable selection criterion, which may be defined in business rules 218. Example selection criteria that can be used by the system 202 to select from among multiple candidate devices for carrying out a function of a security event handling policy can include, but are not limited to, a preferred device vendor, a load balancing criterion (e.g., a preference to select the device having the lowest processing workload among the candidate devices), a preference to select the device that requires the least amount of re-configuration of the candidate devices (e.g., by selecting a device that is already monitoring the data traffic on the relevant portion of the network and therefore only requires a configuration update to implement reporting or countermeasures), or other such criteria. Once a suitable device has been selected, instruction translation component 206 can generate device-specific and vendor-specific configuration instructions understandable by the selected target device. When executed by the device, these configuration instructions configure the device to carry out the security event handling functions.

In another example, the instruction translation component 206 may determine that the user's defined security event policy for a zone could be optimally implemented by configuring multiple devices within the zone to collaboratively perform one or more functions of the policy, rather than configuring a selected one of the devices to perform all necessary functions of a given security event policy. For example, based on analysis of the model 216, the instruction translation component 206 may determine that one of the devices 408 within the zone (e.g., a firewall device or another type of network infrastructure device) is best suited for performing data traffic monitoring necessary for a desired security event handling policy, while another of the devices 408 is best suited for dispatching notifications in the event of a detected security event that is a function of the data traffic. Accordingly, the instruction translation component 206 can generate a first set of device configuration instructions that configure the first device to perform the required data traffic monitoring functions and to inform the second device when the data traffic satisfies a criterion indicative of the security event, and can generate a second set of second device configuration instructions that configures the second device to perform the required notification functions in response to being informed of the security event by the first device. As in previous examples, the instruction translation component 206 formats these device configuration instructions to be understandable by the respective target, taking into account the type and vendor of each device as recorded in the model 216.

Depending on the specifics of the desired security event policy defined by configuration input 1502, instruction translation component 206 can generate device configuration instructions for configuring selected target devices to carry out portions of the specified security event policy. These instructions can configure the devices to perform such functions as data traffic monitoring, generating notifications directed to specified servers or client entities, monitoring of specific control or communication parameters of a networking or control device, changing an operating mode of a controlled automation system in response to detection of a security event, disabling communication ports, or other such functions.

Specific reconfiguration actions that can be carried out by the devices 408 in accordance with the security event configuration data 1504 can include, but are to limited to, modification of a communication parameter of a networking or control device, modification of a device's networking address, establishing new communication channels between two selected devices (e.g., between two plant floor devices for the purpose of implementing a coordinated security event handling protocol involving the two devices, or between a plant floor device and a server for notification or logging purposes), altering a control routine of an industrial controller to facilitate switching to a specified operating mode in response to detection of a security event, enabling specific security modes on selected devices, enabling key-based or certificate-based security protocols in selected devices, distributing encryption keys or certificates to devices to facilitate secure communication (e.g., if the devices or zones are configured for key- or certificate-based security), updating one or more whitelists that explicitly identify devices that are permitted to communicate with a given device, modifying router or switch settings, other such functions.

Once the instruction translation component 206 has identified which devices 408 require reconfiguration in order to implement the desired security event handling policy and has generated appropriate device-specific configuration instructions for reconfiguring these devices accordingly, communication component 208 deploys these instructions to the relevant devices 408 as security event configuration data 1504 (similar to deployment of security configuration data 404 as described above). Since the instruction translation component 206 is preconfigured with translation instructions for a variety of different device vendors, the security configuration system 202 can implement the user's specified security event handling rules even if the collection of industrial assets is made up of devices from multiple different vendors. The security configuration system 202 thus provides the user with a simple, vendor-agnostic interface for defining a plant-wide security event handling strategy for a collection of industrial assets, and translates this strategy into a set of vendor- and device-specific security configuration instructions which are then deployed to the appropriate devices 408. By abstracting the user from the device-specific technical details of configuring security event management settings and modes for each individual device, the system 202 mitigates the need for the user to possess an in-depth technical knowledge of specific device types and vendors in order to configure device-level security event management as part of a larger plant-level security strategy.

Although the examples described above consider scenarios in which model 216 is initially built in order to define secure communication policies between industrial assets and to provision these policies as security configuration data 404, and is then further leveraged to apply security event handling policies to the zones defined in the model 216, it is to be appreciated that some embodiments of system 202 can allow the user to create a model 216 that groups industrial assets into zones, and use this model 216 solely to define and apply zone-specific security event management policies for the devices within the zones without also defining secure communication rules and policies. In general, the approaches described above can be used to provision both security configuration data 404 as well as security event configuration data 1504 using the same model 216, or can be used to provision only one of these types of configuration data.

In some embodiments, after the industrial devices 408 have been configured to implement zone-specific security event handling policies as described above, the security configuration system 202 can monitor the devices to ensure that parameter settings that were set in order to carry out the defined security event policies are not subsequently modified in a manner that violates the policies. In response to detection of an attempted reconfiguration of a device in a manner that causes the device to operate in violation of the security event policy (e.g., in a manner that causes the device to cease performing a necessary function of the policy, such as a monitoring or notifying function), the system 202 can override the attempted modification. The system 202 may also send a notification to a system administrator in response to the attempted modification. For example, if the system had previously configured two devices to establish a bi-directional communication channel between the devices as part of a security event handling strategy, and a plant engineer subsequently attempts to modify the communication settings of one of the devices in a manner that disables this communication channel, system 202 can send an override instruction to the device that reinstates the previous communication setting, thereby ensuring that the existing security event management policies remain in place.

Once the user has defined secure device communication policies and/or security event handling policies and applied these policies to the relevant networking and industrial devices 408 that make up the industrial environment, as described in the preceding examples, it may be necessary to subsequently replace a device 408 that operates in accordance with the defined security policies, or to add a new device to an automation system that operates under the purview of the defined policies. To mitigate the need for a system designer to manually initiate re-deployment of security configuration data to the replacement or new device, one or more embodiments of security configuration system 202 can support automatic assignment of policy-specific security configuration data to a new device in response to detecting registration of the new device.

Figure 17:
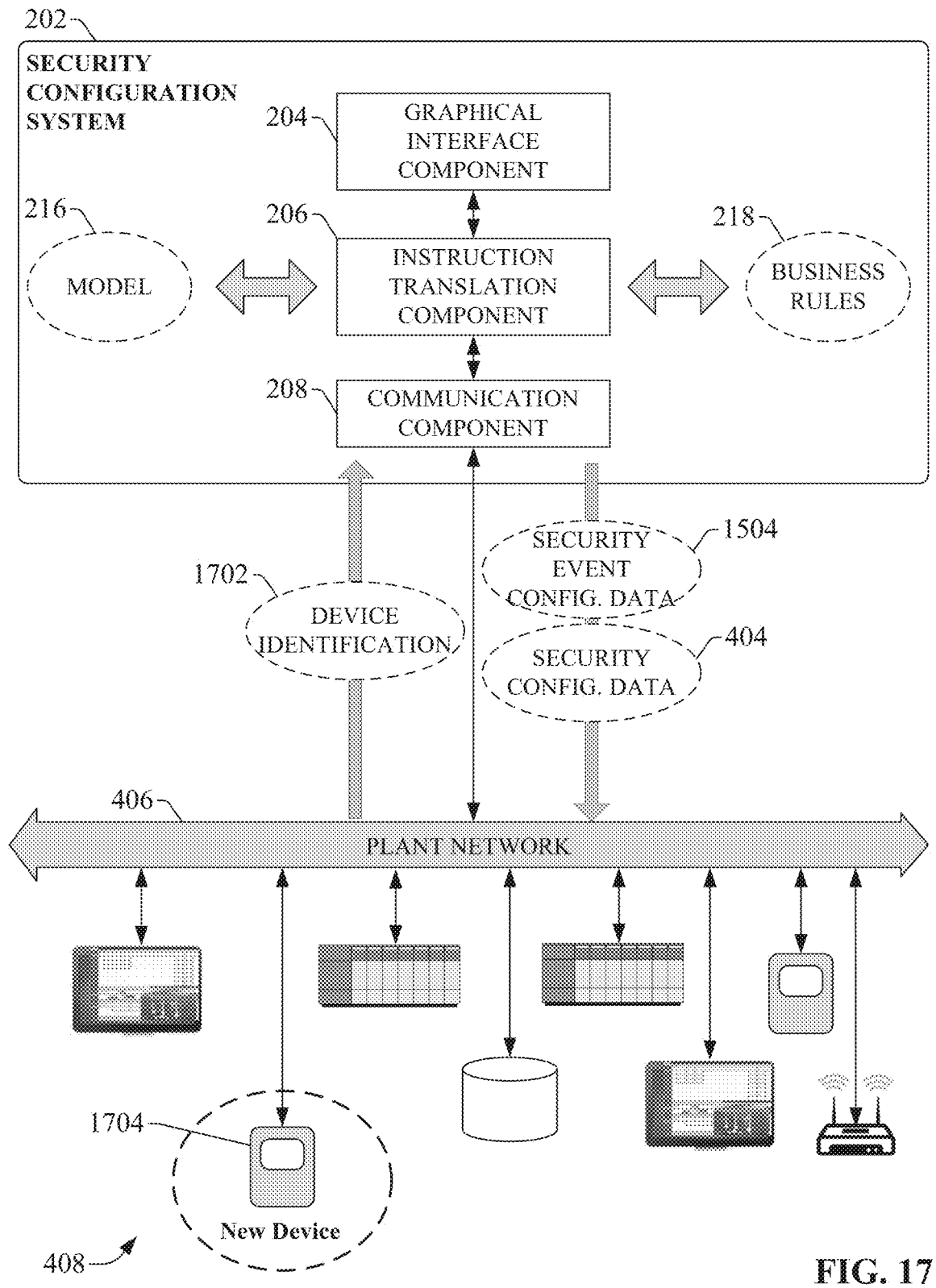
FIG. 17 is a diagram of an example architecture in which devices have been previously configured by a security configuration system to enforce defined security policies, and in which a newly registered device is automatically configured in accordance with the policies.

FIG. 17 is a diagram of an example architecture in which devices 408 have been previously configured by the security configuration system 202 to enforce defined security policies, and in which a newly registered device 1704 is automatically configured in accordance with the policies. New device 1704 may be a replacement device intended to replace another device that was in place at the time the security policies were initially deployed. Alternatively, new device 1704 may be an additional device installed as part of a new or expanded automation system. In either case, at the time of its installation, new device 1704 is not initially configured to enforce the secure communication and event handling policies that have already been defined using system 202.

Communications component 208 is configured to detect that a new device 1704 has been installed on the plant network 406 based on device identification data 1702 submitted to the system 202 by the new device 1704 upon installation. Device identification data 1702 may identify, for example, the device's type, model, and/or vendor information; a durable device identifier such as a media access control (MAC) address, the device's current firmware version, or other such information. As will be discussed in more detail below, device identification data 1702 may also comprise identity credentials (e.g., enrollment over secure transport, or EST, credentials) obtained by the new device 1704 from an identity authority as part of the device's registration process. As such, the device identification data 1702 may include validated authentication information that indicates to the system 202 that the device 1704 is authorized to operate in conjunction with the existing devices 408, subject to the defined security policies. If the device identification data 1702 is validated, the security configuration system 202 then determines, based on the device identification data 1702, where the new device 1704 resides within the organization of zones and conduits recorded in the model 216, determines how the new device 1704 should be configured in order to comply with the existing security policies given the device's role or location within the model 216, and generates appropriate security configuration data 404 and/or security event configuration data 1504 designed to configure the new device 1704 to comply with the existing security policies. Instruction translation component 206 generates this new configuration data 404, 1504 based on the type and vendor of the new device 1704, such that the new configuration data 404, 1504 is understandable and executable by the new device 1704.

Figure 18:
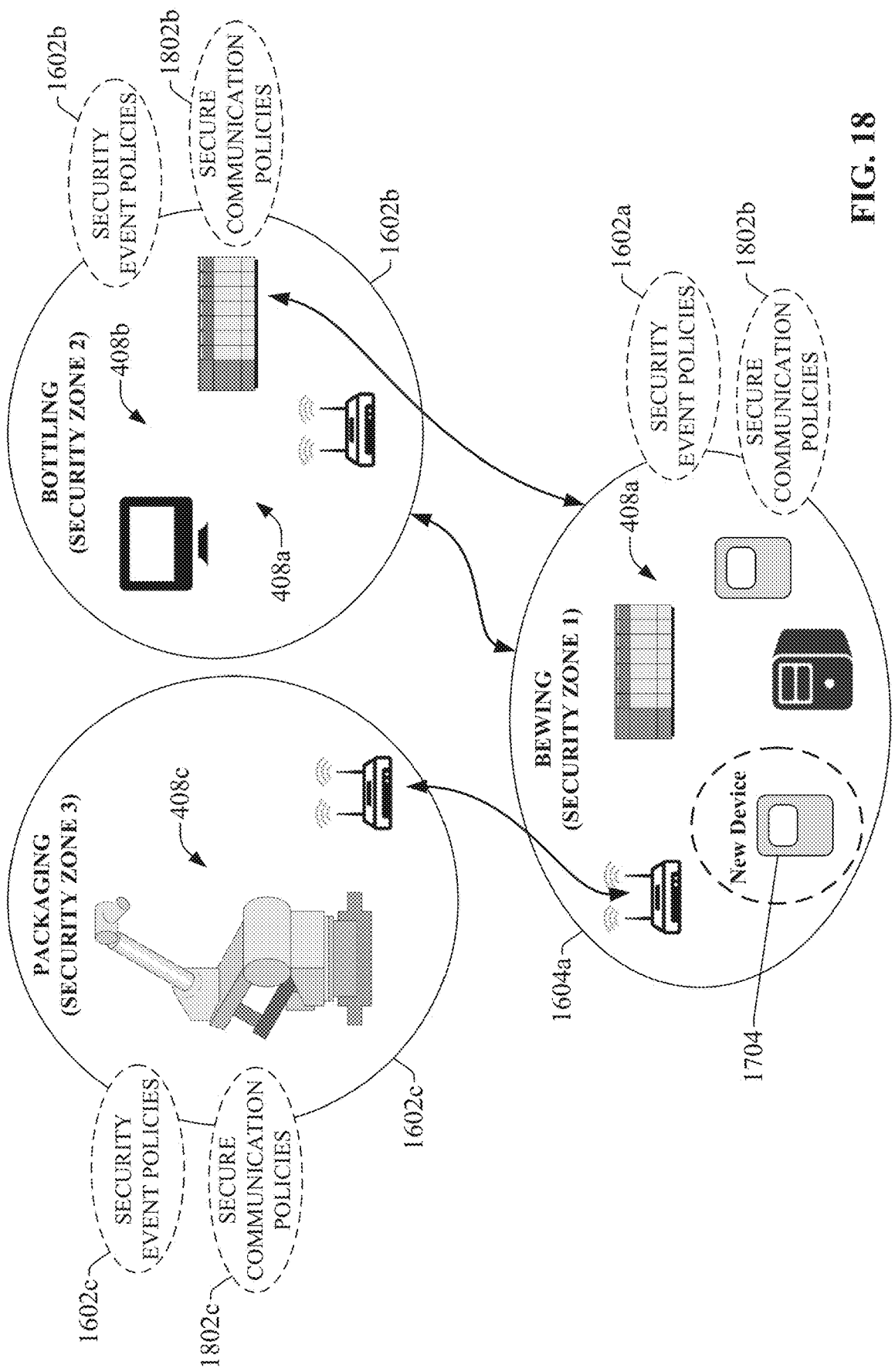
FIG. 18 is a diagram illustrating the assignment of a new device within the context of an existing organization of security zones defined by a model.

FIG. 18 is a diagram illustrating assignment of the new device 1704 within the context of an existing organization of security zones defined by model 216. In this example, new device 1704 has been installed within the example brewing plant discussed in connection with FIG. 16. In an example scenario, new device 1704 can be a replacement device (e.g., a motor drive, an industrial controller, a network router, a server, etc.) that replaces an older device that was already installed at the time the security configuration system 202 had initially distributed security configuration data 404 and/or security event configuration data 1504 in accordance with user-defined security policies. In the illustrated example, new device 1704 replaces a device that previously executed within the brewing area of the facility, and which is therefore defined in the model 216 as being part of security Zone 1 (the zone into which the system designer has grouped the industrial assets associated with the brewing area). When new device 1704 is installed on the network and submits its device identification data 1702 to the security configuration system 202 (e.g., via plant network 406 and any intervening networks), instruction translation component 206 can cross-reference the identification data 1702 for the new device with the existing model 216 to determine whether the new device 1704 corresponds to a matching device already defined in the model 216, and if so, the new device's placement within the organization of zones and conduits defined by the model 216.

In response to receiving the device's identification data 1702 and determining, based on this data 1702 and analysis of model 216, that the new device 1704 is a replacement for a device that had previously been operating within security Zone 1, the instruction translation component 206 determines the new device's placement within the organization of zones and conduits defined by the model 216. Based on this information, the instruction translation component 206 further determines how the new device 1704 should be configured in order to comply with the system-wide secure communication policies 1802 defined by the model 216, as well as to comply with zone-specific security event handling policies 1602.

If new device 1704 is a straight replacement for its predecessor device—that is, the new device 1704 is the same model number and vendor as its predecessor—instruction translation component 206 may issue the same security configuration data 404 and/or security event configuration data 1504 to the new device 1704 that had been previously issued to its predecessor device. Alternatively, if the new device 1704 performs substantially the same functional role as its predecessor device but is made by a different product vendor, or is a different model, than its predecessor device, instruction translation component 206 may generate new configuration data 404, 1504 that conforms to a format understandable by the new device 1704, and which suitably configures the new device 1704 to operate in accordance with the existing secure communication and security event handling policies. For example, the new device 1704 may have a different set of available configuration parameters than its predecessor device, and therefore cannot be configured using the same parameter settings as its predecessor. Accordingly, instruction translation component 206 can reference its vendor-specific translation instructions in view of the device identification data 1702 and the existing security policies to generate appropriate security configuration data that, when executed on the new device 1704, configures the device 1704 to operate and communicate in accordance with the existing security policies. In the example depicted in FIG. 18, this includes configuring the new device 1704 to communicate securely with all other devices in Zone 1, to communicate securely with devices in Zone 2 (per the defined zone-to-zone conduit between Zone 1 and Zone 2), and to support the security event policies 1602a defined for Zone 1. If the new device 1704 is determined to be replacing a device for which a conduit to another asset or zone is defined in the model 216, the configuration data issued to the new device 1704 will also configure the device 1704 to securely communicate with the other asset or zone. Once appropriate configuration instructions for suitably configuring the new device 1704 to comply with the existing security policies have been determined, communication component 208 deploys the configuration instructions as security configuration data 404 and/or security event configuration data 1504 directed to the new device 1704, as described in previous examples (e.g., via plant network 406 and any intervening networks).

In some cases, configuring the new device 1704 may necessitate a configuration modification to one or more other devices 408 in order to facilitate secure communication with the new device 1704 per the existing secure communication policies. For example, if the new device 1704 is assigned a different network address than its predecessor device, the instruction translation component 206 may determine, based on the existing security policies, which other devices 408 are currently permitted to securely communicate with the new device 1704, and therefore require reconfiguration to recognize and communicate with the new device address. Based on these determinations, instruction translation component 206 generates new device configuration instructions for any devices that require such reconfiguration, and issues corresponding security configuration data 404 and/or security event configuration data 1504 to these devices. Such reconfiguration actions may include, for example, redefining access permissions for respective industrial assets, updating digital certificates, assigning new network addresses to respective devices, redefining network workgroups, reconfiguring firewall parameters, updating whitelists, or other such reconfiguration actions.

In some scenarios, the newly installed device 1704 may not be a replacement for a preexisting device, but rather is a new device 1704 that was not accounted for in the existing model 216. Such new devices 1704 may be installed as part of a newly installed automation system within one of the production areas, or as part of a rebuild of an existing automation system. If the security configuration system 202 determines that the new device 1704 does not match an existing device defined in the model 216, the instruction translation component 206 may configure the new device 1704 according to a "first-contact" policy predefined by the system designer to be applied to any authorized new device that does not correspond to a device already defined in the model 216. The specifics of the first-contact policy can depend on the system designer's overall security plan and the specifics of the industrial operations. For example, the system 202 may configure the new device 1704 to permit all unsecured access to the device 1704, or may apply a specified degree of security to the device as a default device-level policy. In another example, the first-contact policy may assign the new device 1704 to a security zone designated for devices that are recognized but have not yet been assigned a definitive security policy. As in previous examples, the instruction translation component 206 will generate and issue configuration instructions to the device in accordance with the vendor and model of the new device 1704.

Alternatively, in some embodiments, the security configuration system 202 may be configured to infer a suitable configuration to be applied to the new device 1704 in compliance with existing secure communication and/or security event management policies. For example, based on the device identification data 1702 submitted by the new device 1704, the instruction translation component 206 may determine that the new device 1704 has been installed as an asset within a production area corresponding to one of the security zones defined in the model 216 (e.g., Zone 1 in the example depicted in FIG. 18). The system 202 can make this determine based on such factors as a determined relationship between the new device 1704 and an existing device within the zone, a reported location of the new device 1704 within the plant facility (which may correspond to a defined security zone), or other such considerations. Based on this determination that the new device 1704 is to be included in the group of assets assigned to Zone 1, instruction translation component 206 can generate and send security configuration data 404 that applies relevant Zone 1 communication policies to the device 1704, and/or security event configuration data 1504 that configures the device 1704 to enforce the security event policies 1602a associated with Zone 1.

In some scenarios, detection of a new device 1704 within a security zone may cause the instruction translation component 206 to reassess how the existing secure communication policies and/or the security event management policies for the zone should be implemented within the zone given the presence of the new device 1704. For example, based on the function or location of the new device 1704 within the zone, instruction translation component 206 may determine that the new device 1704 is a more suitable candidate for carrying out a data traffic monitoring function than another device currently carrying out this function in accordance with a defined security event handling policy for the zone. Based on this determination, the instruction translation component 206 may reconfigure the new device 1704 to carry out the data traffic monitoring, and reconfigure the previous monitoring device to cease these monitoring activities. The system 202 will also reconfigure any other devices necessary to reflect the transfer of traffic monitoring functionality to the new device 1704. Any suitable criterion can be used to determine whether and how to update the device configurations given the addition of a new device 1704, including but not limited to a load balancing criterion, relative assessments of the devices' capabilities, or other such factors.

In some embodiments, the device identification data 1702 submitted by new device 1704 may initially be obtained from an identity authority as part of a device enrollment process. For example, as shown in the example architecture of FIG. 1, an identity authority server 130 accessible by devices on the plant network 116 may reside on a network within the plant facility (e.g., the office network 108 or plant network 116) or on a cloud platform. This identity authority server 130 can be configured to receive enrollment requests from new devices and, in response to verifying that the device 1704 is authorized to operate within the plant facility, issue device identity credentials to the devices. In this regard, the identity authority server 130 acts as the shared root of trust for the plant facility as a whole. In an example embodiment, the identity authority server 130 may support an enrollment over secure transport (EST) protocol for managing and issuing device identity credentials to industrial devices.

In some embodiments, the device identity credentials obtained by a new device 1704 from the identity authority server 130 can be included in the device identification data 1702 subsequently provided to the security configuration system 202 to initiate assignment of security configuration data to the device 1704. In such embodiments, the presence of the device identity credentials as part of device identification data 1702 indicates to the security configuration system 202 that the device 1704 is authorized and should be assigned a security configuration to permit communication with the other system devices in accordance with existing policies.

Figure 19:
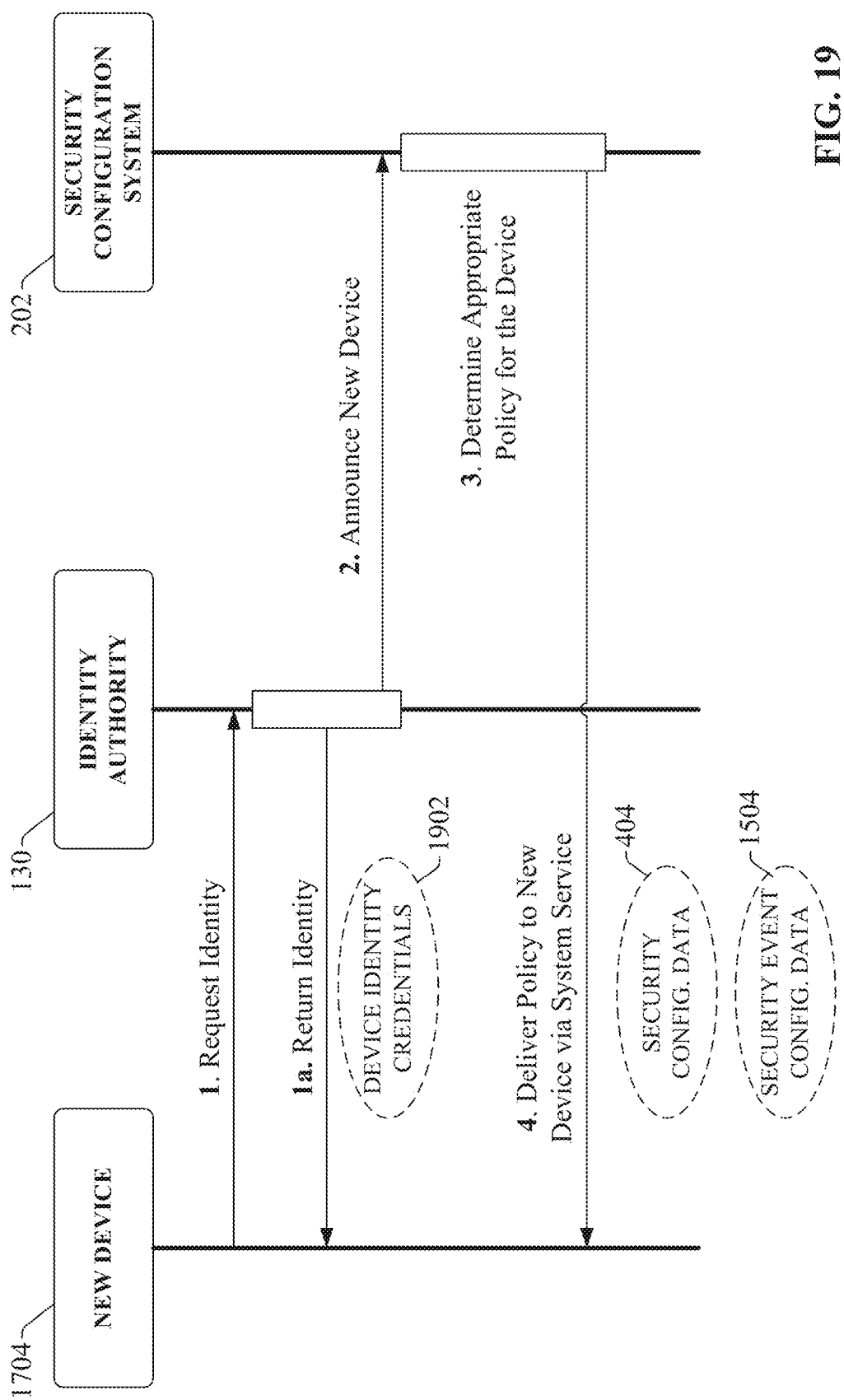
FIG. 19 is a process flow diagram illustrating an example of a device enrollment and security configuration process.

In other embodiments, the identity authority server 130 can work in direct conjunction with the security configuration system 202 to issue an appropriate security configuration to the new device 1704 as part of the device enrollment procedure. FIG. 19 is a process flow diagram illustrating an example device enrollment and security configuration process. This process is initiated when the new device 1704 is installed on the plant network 406 and powered up, or is otherwise brought online in a manner that renders the device accessible to the identity authority server 130 and the security configuration system 202. Initially, when the new device 1704 is installed, the device 1704 initiates the device enrollment process by locating the identity authority server 130 and sending a request for an identity to the identity authority server 130 (step 1). In some embodiments, this may comprise a request for EST identity credentials. As part of the request, the new device 1704 may provide device information—e.g., the device's type, model, vendor, a durable device identifier such as a MAC address, etc.—that can be used by the identity authority server 130 to determine whether the device 1704 is to be granted identity credentials and configured for secure communication and event management.

In response to receipt of the identity request, the identity authority server 130 determines whether the device 1704 is to receive a security policy and be permitted to operate within the industrial environment. In some embodiments, the identity authority server 130 can permit operation of the device if one or more items of the device information submitted by the device 1704 (e.g., the device model, vendor, durable device identifier, etc.) is included on a predefined list of permissible devices (e.g., a list of permissible replacement devices, a list of verified device vendors, etc.). Identity authority server 130 may also support provisions for allowing a system administrator to explicitly approve the use of the device 1704 if the device is not already included on a predefined list of approved devices. Other approaches for determining whether the device 1704 is permitted to operate are also within the scope of one or more embodiments.

In response to determining that the new device 1704 is permitted to operate in the plant environment, the identity authority server 130 issues device identity credentials 1902 to the new device 1704 (step 1*a*). As noted above, these device identity credentials 1902 may comprise EST identity credentials. However, other types of identity credentials are also within the scope of one or more embodiments.

At this stage, prior to configuration of the new device 1704 to comply with the existing security policies defined in model 216, the device identity credentials 1902 serve as a first-contact identity—or quarantine certificate—for the device. These credentials 1902 assign a network identity to the device 1704 while prohibiting communication between the device 1704 and other devices on the network until the security configuration system 202 configures the device 1704 to comply with the existing security policies defined by model 216.

When the identity authority server 130 has approved the device for operation, which initiates provision of the device identity credentials 1902, the identity authority server 130 also announces the new device 1704 to the security configuration system 202 (step 2). In various implementations, the identity authority server 130 and security configuration system 202 can both reside on the same network (e.g., plant network 116 or office network 108) or may reside on separate but connected networks such that the two systems can exchange messages in a bi-directional manner In some implementations, one or both of the identity authority server 130 or the security configuration system 202 can execute on a cloud platform as cloud-based services, and may be securely accessed by the devices 408 on the plant floor via secure connections to the cloud platform.

In response to receiving the announcement of the new device from the identity authority server 130, the security configuration system 202 makes a determination as to which security policies (secure communication and security event management policies) are applicable to the new device 1704 (step 3). As described above, security configuration system 202 can determine which policies are applicable to the new device 1704 based on a determination of whether the new device 1704 is a replacement of an existing device, and therefore corresponds to a device already defined in the security model 216, or is part of a new installation that is not yet represented in the model 216. The example approaches described above for determining whether the device 1704 is a replacement device or a new installation, and for selecting appropriate security policies for the device 1704 based on this determination, can be carried out during this step.

Upon determining which existing security policies are applicable to the new device (e.g., based on the Zone to which the device 1704 is assigned, conduits defined to or from the device 1704, security event management policies applicable to the device's Zone, etc.), the security configuration system 202 generates an appropriate set of configuration instructions designed to configure the device 1704 for operation in accordance with the applicable security policies, and sends the configuration instructions to the device as security configuration data 404 and/or security event configuration data 1504, as described above in connection with FIGS. 17 and 18. As described in previous examples, the security configuration system 202 may also reconfigure other devices during this step based on the addition of new device 1704 in order to optimize the device-level implementation of one or more existing security policies (e.g., to balance processing load between devices that collectively carry out a security event management policy, or based on a reassessment of which devices are best suited for carrying out certain functions of a security policy).

This process for identifying a new or replacement industrial device and automatically commissioning the device to operate in accordance with predefined system-wide or zone-specific security policies can eliminate the need to manually configure devices on an individual basis to operate in accordance with high-level security strategies or rules. By applying previously defined security policies to new devices upon detecting installation of these new devices within the plant facility, the security configuration system 202 acting in conjunction with an identity authority server 130 can allow temporal separation between security policy administration and physical replacement or installation of an industrial or networking device. Consequently, a security-privileged administrator need not be present when a new device is added in order to configure the device for compliance with defined security policies.

Figure 20:
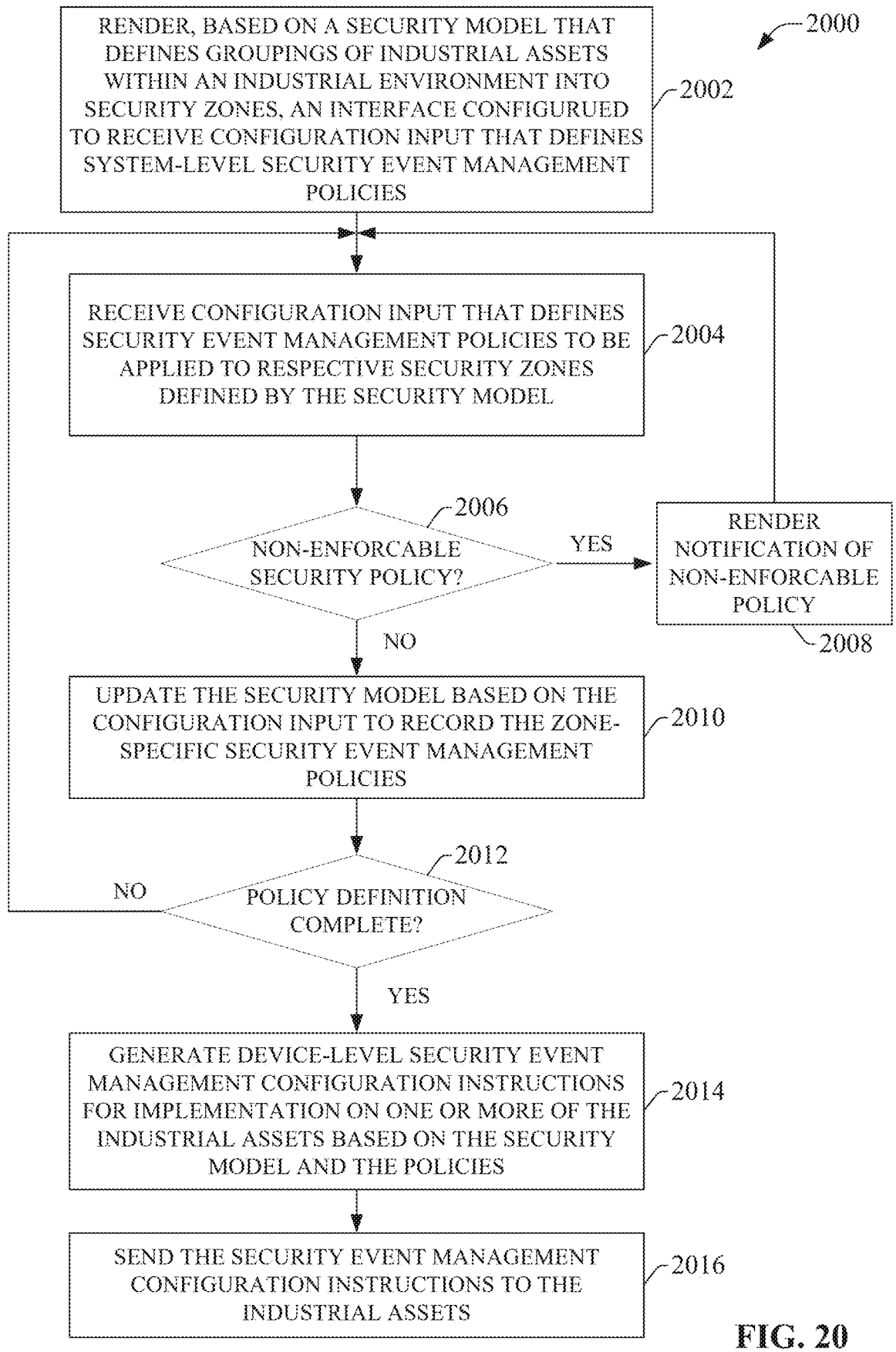
FIG. 20 is a flowchart of an example methodology for configuring and implementing security event management strategies using a model-based industrial security configuration system.
Figure 21A:
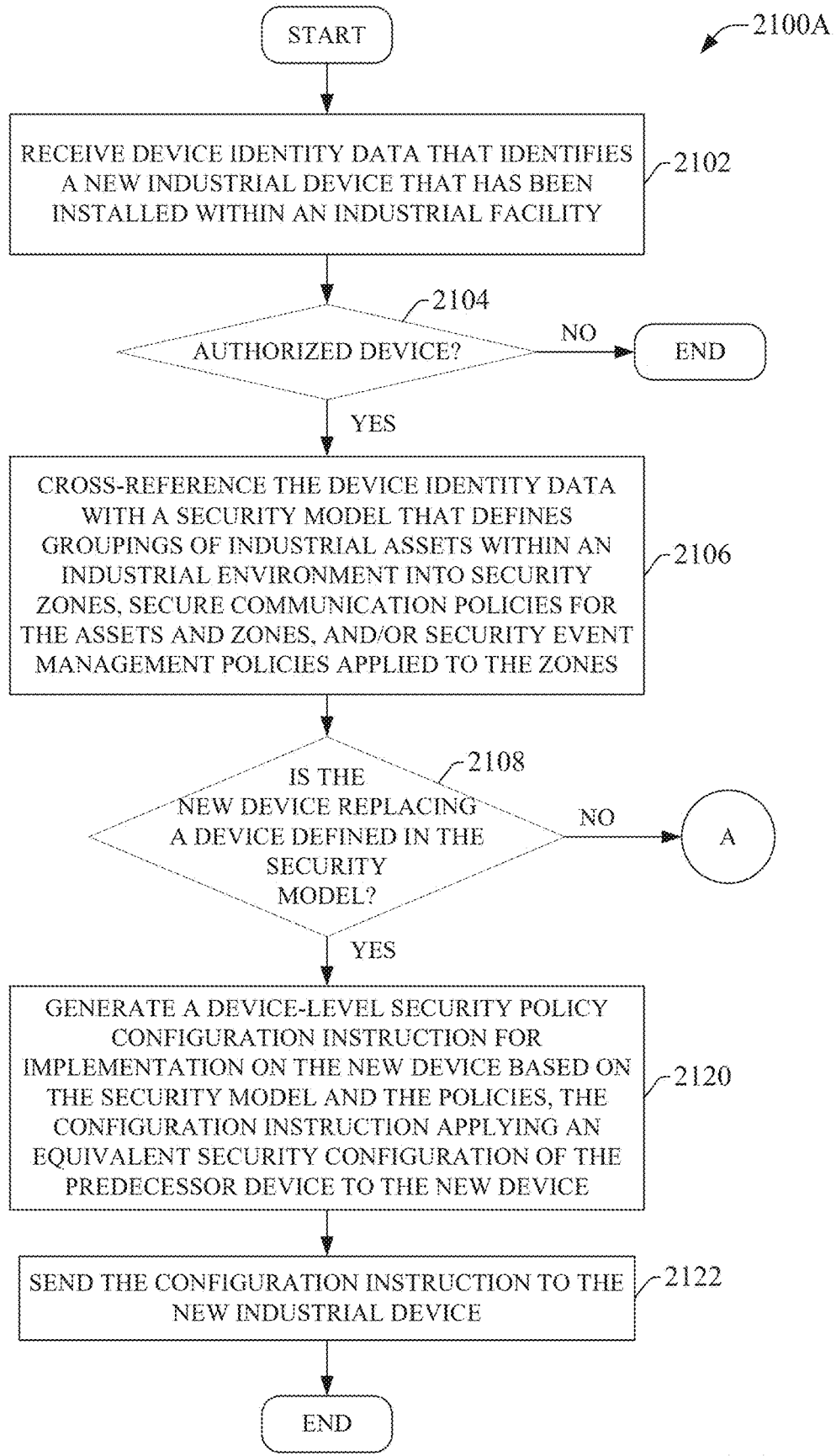
FIG. 21A is a flowchart of the first part of an example methodology for automatically configuring a newly installed industrial device to operate in compliance with previously defined secure communication and security event management strategies.
Figure 21B:
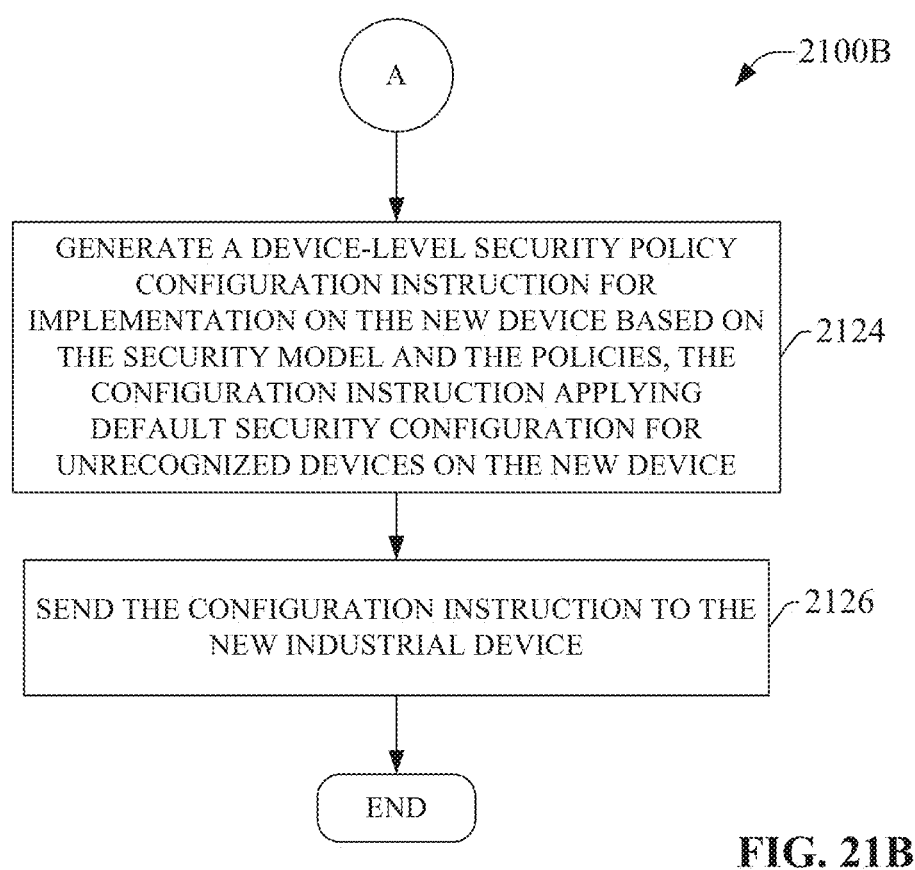
FIG. 21B is a flowchart of the second part of the example methodology for automatically configuring a newly installed industrial device to operate in compliance with previously defined secure communication and security event management strategies.

FIGS. 20-21*b* illustrates example methodologies in accordance with one or more embodiments of the subject application. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 20 illustrates an example methodology 2000 for configuring and implementing security event management strategies using a model-based industrial security configuration system. Initially, at 2002, an interface is rendered based on a security model that defines groupings of industrial assts within an industrial environment into security zones. The interface is configured to receive configuration input that defines system-level security event management policies. In some embodiments, the interface may comprise an interactive hierarchical tree structure that allows a user to define security event management polices for respective security zones defined by the model. Other interface formats for receiving security event management policy preferences are also within the scope of one or more embodiments. The security event configuration input can be submitted in a format that is agnostic to the particular model or vendor of the industrial assets or devices that are to be configured to support the policies. Example configuration input can include definitions of the types of security events to be monitored, notification preferences for delivering notifications in response to detection of a security event, countermeasures to be carried out by the devices in response to detection of a security event, or other such information.

At 2004, configuration input is received via interaction with the interface rendered at step 2002. The configuration input can define desired security event management policies to be applied to respective security zones defined by the security model.

At 2006, a determination is made as to whether a security event policy defined by the configuration input received at step 2004 is non-enforceable. Non-enforceable security event management policies can include, for example, a policy to monitor for a security event that the current architecture of devices is not capable of detecting, a policy to send a notification to a server or client device that cannot be accessed by any of the devices within the relevant zone, a policy to carry out a countermeasure that cannot be performed by any of the devices within the relevant zone, or other such non-enforceable policies. If the system identifies one or more non-enforceable policies (YES at step 2006), the methodology moves to step 2008, where the interface renders a notification of the one or more non-enforceable policies, and returns to step 2004 to allow the user to modify any of the previously entered configuration data in order to eliminate the non-enforceable policy. In some embodiments, the system may generate one or more recommendations based on the previously provided configuration data for modifying the proposed security event management policy in a manner that yields an enforceable policy.

Once the configuration input has been determined to define only enforceable security policies (NO at step 2006), the methodology proceeds to step 2010, where the security model is updated based on the configuration input received at step 2004 to record the zone-specific security event management policies. At 2012, a determination is made as to whether definition of zone-specific security event management policies is complete. If additional policies are to be defined (NO at step 2012), the methodology returns to step 2004, and steps 2004-2012 are repeated until all desired policies have been entered.

When all desired policies have been entered (YES at step 2012), the methodology proceeds to step 2014, where the system generates, for each security zone for which security event management policies have been defined, a set of device-level security event configuration instructions for implementation on one or more of the industrial assets within the zone. These security event configuration instructions are generated based on an analysis of the security model, including the security event management policies defined by the configuration input provided by the user at step 2004. In one or more embodiments, the system that generated the interface at step 2002 can maintain a translation engine capable of converting the security event management policies defined by the configuration input into device- and vendor-specific security event configuration instructions that, when executed on the individual target devices, will implement the zone-specific security event management policies. These configuration instructions may comprise, for example, network address settings, automated notification settings, instructions to configure a device to monitor for a specified security event, whitelist entries, instructions to enable selected device-level security features, firewall device settings, or other such instructions. The system's translation engine can include knowledge of the types and formats of security event configuration instructions supported by a range of different device types and vendors, allowing the system to appropriately map the security event management policies defined by the model to a set of vendor- and model-specific device-level security event configuration instructions in order to implement the defined security policy. At 2016, the security event configuration instructions generated at step 2014 are sent to the appropriate industrial assets on the plant floor (e.g., via the plant network).

FIG. 21A illustrates a first part of an example methodology 2100A for automatically configuring a newly installed industrial device to operate in compliance with previously defined secure communication and security event management strategies. Initially, at step 2102, device identity data is received that identifies a new industrial device that has been installed within an industrial facility. The device identity data can be received, for example, by a security configuration system that manages security policies for a plant environment. In some system configurations, the device identity data can be received from the device itself, which submits its identification information upon installation and power-up. Alternatively, the device identity data can be received from an identity authority server that manages device authentication and identity credentials for devices that operate within the plant facility. The device identity data can comprise, for example, validated authentication information indicating that the device is authorized to operate in conjunction with other devices within the plant facility (subject to existing secure communication policies); the device's type, model, and/or vendor information; a durable device identifier such as a MAC address; or other such device identification information.

At 2104, a determination is made as to whether the device identity data received at step 2102 corresponds to an authorized device permitted to operate within the plant facility. In some scenarios, the device's authorization can be verified based on a determination that the device identity data corresponds to a device included on a list of approved devices. The device may also be verified by the identity authority server, which can inform the security configuration system that the device is permitted to operate. If the device is not authorized (NO at step 2104), the methodology ends. Alternatively, if the device is authorized, the methodology proceeds to step 2106, where the device identity data received at step 2102 is cross-referenced with a security model that defines groupings of industrial assets within the industrial environment into security zones, secure communication policies for the assets and zones, and/or security event management policies that are defined for each of the zones. This cross-referencing determines whether the new device is a replacement of a pre-existing device, and therefore has a corresponding representation in the security model, or if the new device is part of a new installation that is not already recorded in the security model.

At 2108, a determination is made, based on the cross-referencing performed at step 2106, as to whether the new device is a replacement device for a previously operating device defined in the security model. If the device is found to be a replacement device (YES at step 2108), the methodology proceeds to step 2120, where a device-level security policy configuration instruction is generated for implementation on the new device. The configuration instruction can be generated based on the security model and its associated secure communication and/or security event management policies, and is designed to apply an equivalent security configuration of the previous device to the new device. If the new device is a different model or vendor than its predecessor device the system can, if necessary, leverage translation rules to determine a suitable formatting for the configuration instruction that is understandable by the new device and that implements equivalent security settings (e.g., secure communication settings and/or security event management settings). At 2122, the configuration instructions generated at step 2120 are sent to the new device to facilitate configuration of the device to communicate and operate in accordance with the security policies defined in the security model.

If it is determined at step 2108 that the new device is not a replacement device, but rather is part of a new installation that is not already recorded in the security model (NO at step 2108), the methodology proceeds to the second part 2100B illustrated in FIG. 21B. At 2024, a device-level security policy configuration instruction is generated for implementation on the new device, based on the security model and its associated secure communication and/or security event management policies. In this case, the configuration instruction is configured to apply, to the new device, a default security configuration defined for unrecognized devices (e.g., devices that are permitted to operate but are not yet modeled in the security model). This default security configuration may be based on an assignment of the new device to a modeled security zone that is reserved for unrecognized devices, and for which a set of default secure communication and/or security event management policies have been defined. At 2126, the configuration instructions generated at step 2124 are sent to the new device to facilitate configuration of the device to communicate and operate in accordance with the default security policies for unrecognized devices.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks.

The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as Common Industrial Protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 22:
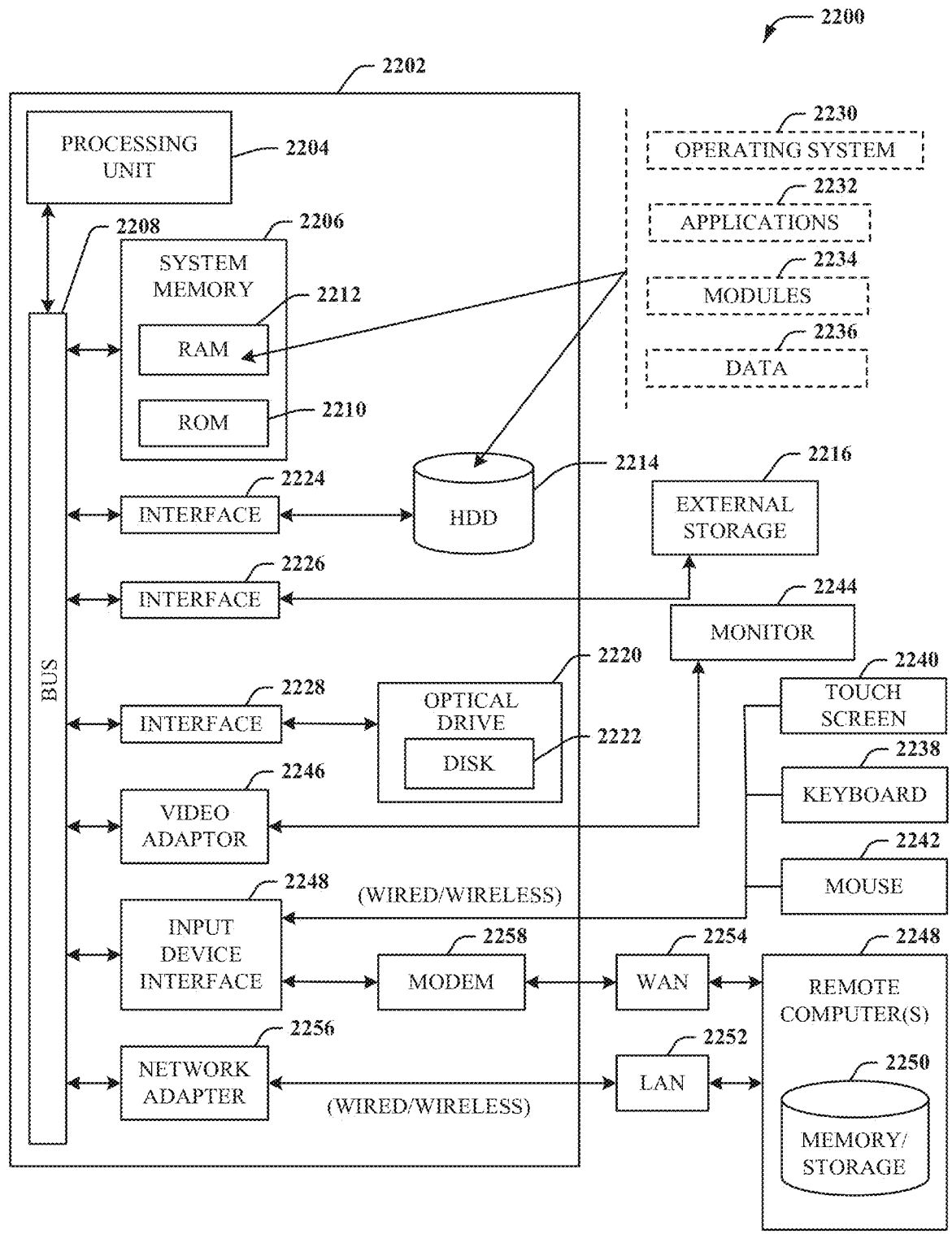
FIG. 22 is an example computing environment.
Figure 23:
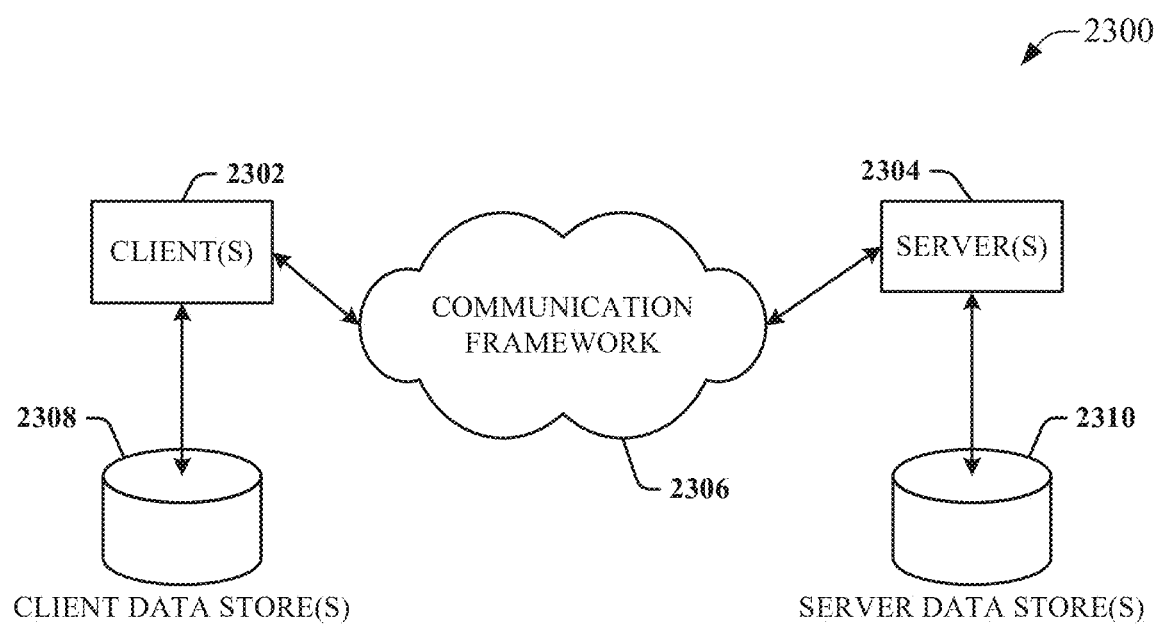
FIG. 23 is an example networking environment.

In order to provide a context for the various aspects of the disclosed subject matter, FIGS. 22 and 23 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22 the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and an optical disk drive 2220 (e.g., which can read or write from a CD-ROM disc, a DVD, a BD, etc.). While the internal HDD 2214 is illustrated as located within the computer 2202, the internal HDD 2214 can also be configured for external use in a suitable chassis (not shown). Additionally, while not shown in environment 2200, a solid state drive (SSD) could be used in addition to, or in place of, an HDD 2214. The HDD 2214, external storage device(s) 2216 and optical disk drive 2220 can be connected to the system bus 2208 by an HDD interface 2224, an external storage interface 2226 and an optical drive interface 2228, respectively. The interface 2224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for application programs 2232. Runtime environments are consistent execution environments that allow application programs 2232 to run on any operating system that includes the runtime environment. Similarly, operating system 2230 can support containers, and application programs 2232 can be in the form of containers, which are lightweight, standalone, executable packages of software that include, e.g., code, runtime, system tools, system libraries and settings for an application.

Further, computer 2202 can be enable with a security module, such as a trusted processing module (TPM). For instance with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 1394 serial port, a game port, a USB port, an IR interface, a BLUETOOTH® interface, etc.

A monitor 2244 or other type of display device can be also connected to the system bus 2208 via an interface, such as a video adapter 2246. In addition to the monitor 2244, a computer typically includes other peripheral output devices (not shown), such as speakers, printers, etc.

The computer 2202 can operate in a networked environment using logical connections via wired and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wired/wireless connectivity to a local area network (LAN) 2252 and/or larger networks, e.g., a wide area network (WAN) 2254. Such LAN and WAN networking environments are commonplace in offices and companies, and facilitate enterprise-wide computer networks, such as intranets, all of which can connect to a global communications network, e.g., the Internet.

When used in a LAN networking environment, the computer 2202 can be connected to the local network 2252 through a wired and/or wireless communication network interface or adapter 2256. The adapter 2256 can facilitate wired or wireless communication to the LAN 2252, which can also include a wireless access point (AP) disposed thereon for communicating with the adapter 2256 in a wireless mode.

When used in a WAN networking environment, the computer 2202 can include a modem 2258 or can be connected to a communications server on the WAN 2254 via other means for establishing communications over the WAN 2254, such as by way of the Internet. The modem 2258, which can be internal or external and a wired or wireless device, can be connected to the system bus 2208 via the input device interface 2248. In a networked environment, program modules depicted relative to the computer 2202 or portions thereof, can be stored in the remote memory/storage device 2250. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2252 or WAN 2254 e.g., by the adapter 2256 or modem 2258, respectively. Upon connecting the computer 2202 to an associated cloud storage system, the external storage interface 2226 can, with the aid of the adapter 2256 and/or modem 2258, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 23 is a schematic block diagram of a sample computing environment 2300 with which the disclosed subject matter can interact. The sample computing environment 2300 includes one or more client(s) 2302. The client(s) 2302 can be hardware and/or software (e.g., threads, processes, computing devices). The sample computing environment 2300 also includes one or more server(s) 2304. The server(s) 2304 can also be hardware and/or software (e.g., threads, processes, computing devices). The servers 2304 can house threads to perform transformations by employing one or more embodiments as described herein, for example. One possible communication between a client 2302 and servers 2304 can be in the form of a data packet adapted to be transmitted between two or more computer processes. The sample computing environment 2300 includes a communication framework 2306 that can be employed to facilitate communications between the client(s) 2302 and the server(s) 2304. The client(s) 2302 are operably connected to one or more client data store(s) 2308 that can be employed to store information local to the client(s) 2302. Similarly, the server(s) 2304 are operably connected to one or more server data store(s) 2310 that can be employed to store information local to the servers 2304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for configuring security event management in an industrial environment, comprising:
   a memory that stores executable components; and
   one or more processors, operatively coupled to the memory, that execute the executable components, the executable components comprising:
      an interface component that generates an interface display configured to receive, via user interaction with the interface display, security event definition data that defines a security event management policy and a selection of a security zone, of multiple security zones of an industrial environment, to which the security event management policy is to be applied, wherein the multiple security zones are defined by a security model that defines groupings of industrial devices of the industrial environment into the multiple security zones;
      an instruction translation component that generates one or more configuration instructions directed to one or more of the industrial devices based on the security event definition data and identities of industrial devices defined by the security model as being included in the security zone selected by the user interaction, wherein the one or more configuration instructions are configured to set respective device-level configuration settings on the one or more of the industrial devices that cause the one or more of the industrial devices to implement the security event management policy exclusively in the security zone specified by the user interaction; and
      a communication component that sends the one or more configuration instructions to the one or more of the industrial devices.

2. The system of claim 1, wherein the security event definition data defines,
   at least one of a security event that is to initiate generation of a notification, a minimum severity level of the security event that is to initiate the generation of the notification, one or more recipient devices or entities to which the notification is to be directed, or a countermeasure to be carried out in response to detection of the security event.

3. The system of claim 2, wherein the security event is at least one of an increase in data traffic on a network within the security zone in excess of a defined threshold, detection of an unauthorized attempt to access an industrial device within the security zone, or an attempt to perform an unauthorized modification of a control parameter on an industrial device within the security zone.

4. The system of claim 2, wherein a configuration instruction, of the configuration instructions, is configured to at least one of
configure an industrial device, of the one or more of the industrial devices, to monitor for the security event specified by the security event definition data,
configure the industrial device to generate the notification in response to detection of the security event by the industrial device or another industrial device,
configure the industrial device to execute a countermeasure specified by the security event definition data in response to detection of the security event, or
set a communication parameter on the industrial device that facilitates implementation of the security event management policy.

5. The system of claim 1, wherein the instruction translation component
selects, based on the analysis of the security model and the security event definition data, the one or more of the industrial devices that are to be reconfigured in order to implement the security event management policy, and
directs the one or more configuration instructions to the one or more of the industrial devices.

6. The system of claim 5, wherein the instruction translation component selects the one or more of the industrial devices based on at least one of respective capabilities of the industrial devices relative to functional requirements of the security event management policy or respective processing loads on the respective industrial devices.

7. The system of claim 5, wherein the instruction translation component
determines, based on the analysis of the security model, at least one of a device model or a device vendor of an industrial device, of the one or more of the industrial devices, to which a configuration instruction, of the one or more configuration instructions, is to be directed, and
formats the configuration instruction in accordance with the at least one of the device model or the device vendor.

8. The system of claim 1, wherein the interface display is a first interface display, and the interface component:
generates a second interface display configured to receive, via interaction with the second interface display, zone configuration input that groups the industrial devices into the multiple security zones, and generates the security model based on the zone configuration input.

9. The system of claim 1, wherein the communication component:
monitors configurations for the one or more of the industrial devices, and
performs an action in response to detection of a modification to a configuration setting for an industrial device, of the one or more of the industrial devices, that violates the security event management policy defined by the security event definition data.

10. A method for configuring industrial security event management policies, comprising:
receiving, by a system comprising a processor via user interaction with an interface display, security event definition data that defines a security event management policy and selects a security zone, of multiple security zones of an industrial facility, to be subject to the security event management policy, wherein the multiple security zones are defined by a security model that defines an organization of industrial devices of the industrial facility into the multiple security zones;
generating, by the system based on the security event definition data and identities of industrial devices defined by the security model as being included in the security zone selected by the user interaction, one or more configuration instructions directed to one or more of the industrial devices, wherein the one or more configuration instructions are configured to, in response to execution on the one or more of the industrial devices, configure device-level configuration parameters on the one or more of the industrial devices that cause the one or more of the industrial devices to enforce the security event management policy exclusively in the security zone identified by the security event definition data submitted via the user interaction; and
sending, by the system, the one or more configuration instructions to the one or more of the industrial devices.

11. The method of claim 10, wherein the receiving comprises receiving, as a portion of the security event definition data,
at least one of a definition of a security event that is to initiate generation of a notification, a minimum severity level of the security event that is to initiate the generation of the notification, an identity of a recipient devices or an entity to which the notification is to be directed, or a definition of countermeasure to be carried out in response to detection of the security event.

12. The method of claim 11, wherein the security event is at least one of an increase in data traffic on a network within the security zone in excess of a defined threshold, detection of an unauthorized attempt to access an industrial device within the security zone, or an attempt to perform an unauthorized modification of a control parameter on an industrial device within the security zone.

13. The method of claim 11, wherein the generating comprises formatting a configuration instruction, of the one or more configuration instructions, to at least one of
configure an industrial device, of the one or more of the industrial devices, to monitor for the security event specified by the security event definition data,
configure the industrial device to generate the notification in response to detection of the security event by the industrial device or another industrial device,
configure the industrial device to execute a countermeasure defined by the security event definition data in response to detection of the security event, or
set a communication parameter on the industrial device that facilitates implementation of the security event management policy.

14. The method of claim 10, wherein the sending comprises:
selecting, by the system based on the analysis of the security model and the security event definition data, the one or more of the industrial devices to be reconfigured to implement the security event management policy, and
directing, by the system, the one or more configuration instructions to the one or more of the industrial devices.

15. The method of claim 14, wherein the selecting comprises selecting the one or more of the industrial devices based on at least one of respective capabilities of the industrial devices relative to functional requirements of the security event management policy or respective processing loads on the respective industrial devices.

16. The method of claim 14, wherein the generating of the one or more configuration instructions comprises:
determining, based on the analysis of the security model, at least one of a device model or a device vendor of an industrial device, of the one or more of the industrial devices, to which a configuration instruction is to be directed, and
formatting the configuration instruction in accordance with the at least one of the device model or the device vendor.

17. The method of claim 10, further comprising:
monitoring, by the system, configuration settings of the one or more of the industrial devices, and
performing, by the system, an action in response to detection of a modification to a configuration setting of an industrial device, of the one or more of the industrial devices, that violates a security event management policy defined by the security event definition data.

18. A non-transitory computer-readable medium having stored thereon executable instructions that, in response to execution, cause a system comprising at a processor to perform operations, the operations comprising:
receiving, via user interaction with an interface display, security event definition data that defines a security event management policy and specifies a security zone of multiple security zones of an industrial plant, to which the security event management policy is to be applied, wherein the security zones are defined by a security model that defines a segregation of industrial devices of the industrial plant into the security zones;
generating, based on the security event definition data and identities of industrial devices defined by the security model as being grouped into the security zone specified by the user interaction, one or more configuration instructions directed to one or more of the industrial devices, wherein the one or more configuration instructions are configured to, in response to execution on the one or more of the industrial devices, set device-level configuration parameters on the one or more of the industrial devices to cause the one or more of the industrial devices to enforce the security event management policy exclusively in the security zone specified by the user interaction; and
sending the one or more configuration instructions to the one or more of the industrial devices.

19. The non-transitory computer-readable medium of claim 18, wherein the receiving comprises receiving, as a portion of the security event definition data
at least one of a definition of a security event that is to initiate generation of a notification, a minimum severity level of the security event that is to initiate the generation of the notification, an identity of a recipient devices or an entity to which the notification is to be directed, or a definition of countermeasure to be carried out in response to detection of the security event.

20. The non-transitory computer-readable medium of claim 19, wherein the security event is at least one of an increase in data traffic on a network within the security zone in excess of a defined threshold, detection of an unauthorized attempt to access an industrial device within the security zone, or an attempt to perform an unauthorized modification of a control parameter on an industrial device within the security zone.

* * * * *